US010566734B1

(12) United States Patent
Pabouctsidis

(10) Patent No.: US 10,566,734 B1
(45) Date of Patent: Feb. 18, 2020

(54) SYSTEM FOR FACILITATING ELECTRICAL CONNECTION OF A FIRST ELECTRICAL UNIT COMPRISED IN A FIRST OBJECT WITH A SECOND ELECTRICAL UNIT COMPRISED IN A SECOND OBJECT

(71) Applicant: Cosma Pabouctsidis, Scottsdale, AZ (US)

(72) Inventor: Cosma Pabouctsidis, Scottsdale, AZ (US)

(73) Assignee: ROBOTEQ, INC, Scottsdale, AZ (US)

( * ) Notice: Subject to any disclaimer, the term of this patent is extended or adjusted under 35 U.S.C. 154(b) by 0 days.

(21) Appl. No.: 16/427,706

(22) Filed: May 31, 2019

Related U.S. Application Data

(60) Provisional application No. 62/713,820, filed on Aug. 2, 2018.

(51) Int. Cl.
*H01R 13/62* (2006.01)
*H01R 12/70* (2011.01)
(Continued)

(52) U.S. Cl.
CPC ......... *H01R 13/6205* (2013.01); *H01R 11/30* (2013.01); *H01R 12/7005* (2013.01); *H01R 13/24* (2013.01)

(58) Field of Classification Search
CPC ............................ H01R 13/6205; B60L 53/30
(Continued)

(56) References Cited

U.S. PATENT DOCUMENTS 3,603,860 A * 9/1971 Johnson ............. H01R 13/4538 320/109
4,158,802 A * 6/1979 Rose, II ................ H02J 7/0042 320/109

(Continued)

FOREIGN PATENT DOCUMENTS

EP 2533374 A1 12/2012

OTHER PUBLICATIONS

Charging Contacts, https://www.conductix.com/en/product-groups/charging-contacts.

*Primary Examiner* — Neil Abrams

(57) ABSTRACT

A system for facilitating electrical connection of a first electrical unit comprised in a first object with a second electrical unit comprised in a second object is disclosed. The system may include a base unit configured to be attached to the first object. Further, the base unit may include a base body and a base conductive pad disposed in a mid-region of the base body. Further, the system may include a first magnet, a second magnet and a third magnet disposed in the base body. Further, the system may include a holder unit configured to be attached to the second object, including a holder body. Further, the system may include a holder magnet disposed in the holder body. Further, the holder unit may include a moving guide, including a guide body, and a guide conductive pad. Further, the moving guide may include a guide magnet disposed in the guide body.
The holder may be mounted on a mobile device that travels over the base unit. In one position the magnets act to repel movement of the moving guide. In another position the magnets act to attract the moving guide towards the base unit to cause electrical connection between the conductive pads.

20 Claims, 37 Drawing Sheets

(51) Int. Cl.
*H01R 13/24* (2006.01)
*H01R 11/30* (2006.01)

(58) Field of Classification Search
USPC .............................................. 439/39; 320/109
See application file for complete search history.

(56) References Cited

U.S. PATENT DOCUMENTS 4,850,879 A * 7/1989 Langenbahn ........ H01R 13/631 439/10
5,617,003 A * 4/1997 Odachi ................. H01M 10/44 320/108
5,909,100 A 6/1999 Watanabe et al.
8,324,858 B2 * 12/2012 Hill ........................... B60L 5/42 320/109
8,627,906 B2 * 1/2014 Lacour .................. B60L 3/0069 180/2.1
8,796,990 B2 * 8/2014 Paparo .................... H01F 38/14 320/108
8,915,341 B2 * 12/2014 Schmiedle ................ B60L 5/12 191/50
9,130,291 B2 * 9/2015 Poh .................... H01R 13/6205
9,300,081 B2 3/2016 Rudisill et al.
9,616,772 B2 * 4/2017 Hourtane .................. B60L 5/39
9,623,763 B2 * 4/2017 Wechlin .................. H02J 5/005
9,694,685 B2 * 7/2017 Ricci ..................... B60L 3/0015
9,776,516 B2 * 10/2017 Wechlin .................. H01F 38/14
10,144,299 B2 * 12/2018 Kupfer ............... H01R 13/6205
10,179,721 B2 * 1/2019 Teruzzi ................... B66C 13/12
10,439,411 B2 * 10/2019 Narayanasamy .. H01R 13/6205
2014/0222271 A1 8/2014 Merten et al.
2017/0093087 A1 3/2017 Esmaeili et al.
2019/0009680 A1 * 1/2019 Kauffmann .......... H01R 13/631
2019/0263278 A1 * 8/2019 Stockinger .............. B60L 53/16

* cited by examiner

SYSTEM FOR FACILITATING ELECTRICAL CONNECTION OF A FIRST ELECTRICAL UNIT COMPRISED IN A FIRST OBJECT WITH A SECOND ELECTRICAL UNIT COMPRISED IN A SECOND OBJECT

FIELD OF THE INVENTION

The present disclosure relates generally to the field of electrical systems and devices. More specifically, the present disclosure describes a system for facilitating electrical connection of a first electrical unit comprised in a first object with a second electrical unit comprised in a second object.

BACKGROUND OF THE INVENTION

Mobile electrical apparatuses, including autonomous ground robots, like all battery-powered systems, require charging from time to time. Conventionally, the connecting of battery charges to a mobile apparatus is performed by bringing spring-loaded electrical contacts of the mobile apparatus over charging contacts by motion of the mobile apparatus.

However, electrical contacts of the mobile apparatus are permanently extended and pushed into contraction by rubbing against a ramp due to the presence of the spring. Further, friction between the ramp and the mobile apparatus may also deteriorate the electrical contacts due to unwanted wear of the electrical contacts.

Although, the friction which causes unwanted wear may be reduced by the use of a spring with a lower spring constant, however, a lower spring constant may reduce pressure of electrical contacts against the charming contacts, and also lower maximum current carrying capacity. Therefore, an increased current carrying capacity is achieved at the expense of higher wear.

Furthermore, the spring-loaded electrical contacts must always be extended which may lower floor clearance of the mobile apparatus.

Therefore, there is a need for an improved system for facilitating electrical connection of a first electrical unit comprised in a first object with a second electrical unit comprised in a second object that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a system for facilitating electrical connection of a first electrical unit comprised in a first object with a second electrical unit comprised in a second object is disclosed. The system may include a base unit configured to be attached to the first object. Further, the base unit may include a base body comprised of a non-conducting material. Further, the system may include a base conductive pad disposed in a mid-region of the base body. Further, at least a portion of the base conductive pad may be exposed over a surface of the base body corresponding to the mid-region. Further, the base conductive pad may be configured for conducting electricity. Further, the base conductive pad may be electrically coupled to the first electrical unit. Further, the system may include a plurality of base magnets including a first magnet disposed in a first region of the base body, a second magnet disposed in a second region of the base body and a third magnet disposed in the mid-region of the base body. Further, the mid-region may be situated in between the first region and the second region. Further, each of the first magnet and the second magnet may be disposed according to a repelling magnetic orientation. Further, the third magnet may be disposed according to an attracting magnetic orientation. Further, the attracting magnetic orientation may be opposite to the repelling magnetic orientation. Further, the system may include a holder unit configured to be attached to the second object, the holder unit may include a holder body comprised of a non-conducting material. Further, the system may include a holder magnet disposed in the holder body. Further, the holder body may include a cavity. Further, the holder unit may include a moving guide configured to be disposed, at least in part, within the cavity of the holder unit. Further, the moving guide may include a guide body comprised of a non-conducting material. Further, the moving guide may include a guide conductive pad disposed in the guide body. Further, the guide conductive pad may be configured to be electrically coupled to the second electrical unit. Further, the moving guide may include a guide magnet disposed in the guide body. Further, the moving guide may be configured to slidably move within the cavity between a retracted position and an extended position. Further, in the extended position, the moving guide may be configured to form a physical contact between the guide conductive pad and the base conductive pad. Further, a holder attraction force may be associated with magnetic attraction between the holder magnet and the guide magnet. Further, a base attraction force may be associated with magnetic attraction between the guide magnet and the third base magnet when the holder unit may be in proximity to the base unit. Further, the base attraction force may be greater than the holder attraction force by a predetermined quantity. Further, a base repulsion force may be associated with magnetic repulsion between the guide magnet and each of the first base magnet and the second base magnet when the holder unit may be in proximity to the base unit. Further, the second object may be configured to travel over the base unit starting from the first region and traversing towards the second region.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
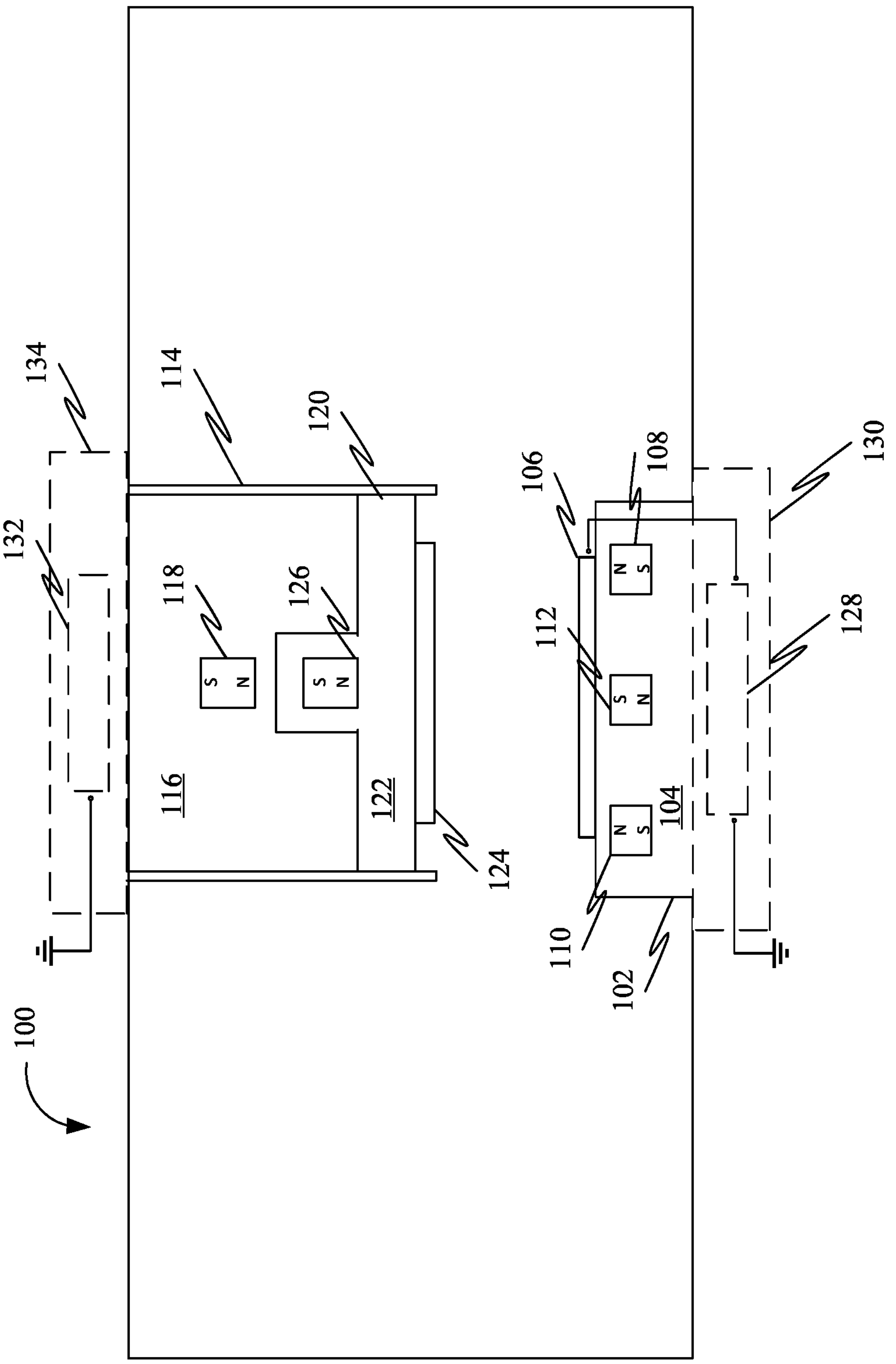
FIG. 1 is a system for facilitating electrical connection of a first electrical unit comprised in a first object with a second electrical unit comprised in a second object, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitation of a secure connection between a charging station and an autonomous robot while charging, embodiments of the present disclosure are not limited to use only in this context.

More generally, the present disclosure describes systems and apparatuses to facilitate a secure connection between a charging station and a mobile electrical device, wherein the mobile electrical device may include, but may not be limited to mobile robots (automatic, semi-automatic, or manual), drones, electric vehicles, and so on.

Overview:

In an embodiment, the system to facilitate a secure connection between a charging station and an autonomous robot while charging may use a combination of a plurality of magnets to actively attract and repel a plurality of electrical contacts for charging a battery of the autonomous robot located on the autonomous robot, and a fixed base. The electrical contacts may engage and disengage the plurality of electrical contacts solely based on a relative position of the plurality of magnets as the autonomous robot may approach, reach, and leave the base. The attraction between the plurality of magnets may help establish a strong electrical connection between the plurality of electrical contacts capable of carrying high current, while the repulsion may ensure a safe and quick disconnection between the plurality of electrical contacts.

The system may use the plurality of magnets to While the autonomous robot is away from the charging base, the plurality of magnets may keep the plurality of electrical contacts retracted, so no friction may be caused as the autonomous robot approaches the base. When the autonomous robot is over the base, powerful magnets located in the base may pull the plurality of electrical contacts together, with the attraction between the plurality of magnets increasing force as the distance between the autonomous robot and the base narrows. When the plurality of electrical contacts touch, the plurality of magnets may be held together with a higher force, making a better electrical connection capable of carrying higher current. As the autonomous robot moves away from the base, one or more magnets of opposite polarity of the plurality of magnets located in the base may cause a repulsive force that may push an electrical contact of the autonomous robot (of the plurality of electrical contacts) into a quick retraction which may result in a safe and near instantaneous disconnection.

FIG. 1 is a system 100 for facilitating electrical connection of a first electrical unit 128 comprised in a first object 130 with a second electrical unit 132 comprised in a second object 134, in accordance with some embodiments. The system 100 may include a base unit 102 configured to be attached to the first object 130. Further, the base unit 102 may include a base body 104 comprised of a non-conducting material. Further, the system 100 may include a base conductive pad 106 disposed in a mid-region of the base body 104. Further, at least a portion of the base conductive pad 106 may be exposed over a surface of the base body 104 corresponding to the mid-region. Further, the base conductive pad 106 may be configured for conducting electricity. Further, the base conductive pad 106 may be electrically coupled to the first electrical unit 128. Further, the system 100 may include a plurality of base magnets including a first magnet 108 disposed in a first region of the base body 104, a second magnet 110 disposed in a second region of the base body and a third magnet 112 disposed in the mid-region of the base body. Further, the mid-region may be situated in between the first region and the second region. Further, each of the first magnet 108 and the second magnet 110 may be disposed according to a repelling magnetic orientation. Further, the third magnet 112 may be disposed according to an attracting magnetic orientation. Further, the attracting magnetic orientation may be opposite to the repelling magnetic orientation. Further, the system 100 may include a holder unit 114 configured to be attached to the second object 134. Further, the holder unit 114 may include a holder body 116 comprised of a non-conducting material. Further, the system 100 may include a holder magnet 118 disposed in the holder body 116. Further, the holder body 116 may include a cavity. Further, the holder unit 114 may include a moving guide 120 configured to be disposed, at least in part, within the cavity of the holder unit 114. Further, the moving guide 120 may include a guide body 122 comprised of a non-conducting material. Further, the moving guide 120 may include a guide conductive pad 124 disposed in the guide body 122. Further, the guide conductive pad 124 may be configured to be electrically coupled to the second electrical unit 132. Further, the moving guide 120 may include a guide magnet 126 disposed in the guide body 122. Further, the moving guide 120 may be configured to slidably move within the cavity between a retracted position and an extended position. Further, in the extended position, the moving guide 120 may be configured to form a physical contact between the guide conductive pad 124 and the base conductive pad 106. Further, a holder attraction force may be associated with magnetic attraction between the holder magnet 118 and the guide magnet 126. Further, a base attraction force may be associated with magnetic attraction between the guide magnet 126 and the third magnet 112 when the holder unit 114 may be in proximity to the base unit 102. Further, the base attraction force may be greater than the holder attraction force by a predetermined quantity. Further, a base repulsion force may be associated with magnetic repulsion between the guide magnet 126 and each of the first base magnet and the second base magnet when the holder unit 114 may be in proximity to the base unit 102. Further, the second object 134 may be configured to travel over the base unit 102 starting from the first region and traversing towards the second region.

In some embodiments, each of the plurality of base magnets, including the first magnet 108, the second magnet 110 and the third magnet 112, the holder magnet 118, and the guide magnet 126 may include permanent magnets.

In some embodiments, the base conductive pad 106 may include a base planar surface. Further, the guide conductive pad 124 may include a guide planar surface. Further, the base planar surface and the guide planar surface may be characterized by a common geometrical feature.

In some embodiments, one or more of the base conductive pad 106 and the guide conductive pad 124 may include of copper-beryllium.

In some embodiments, first object 130 may include one or more of a flooring, a ceiling and a wall.

Figure 2:
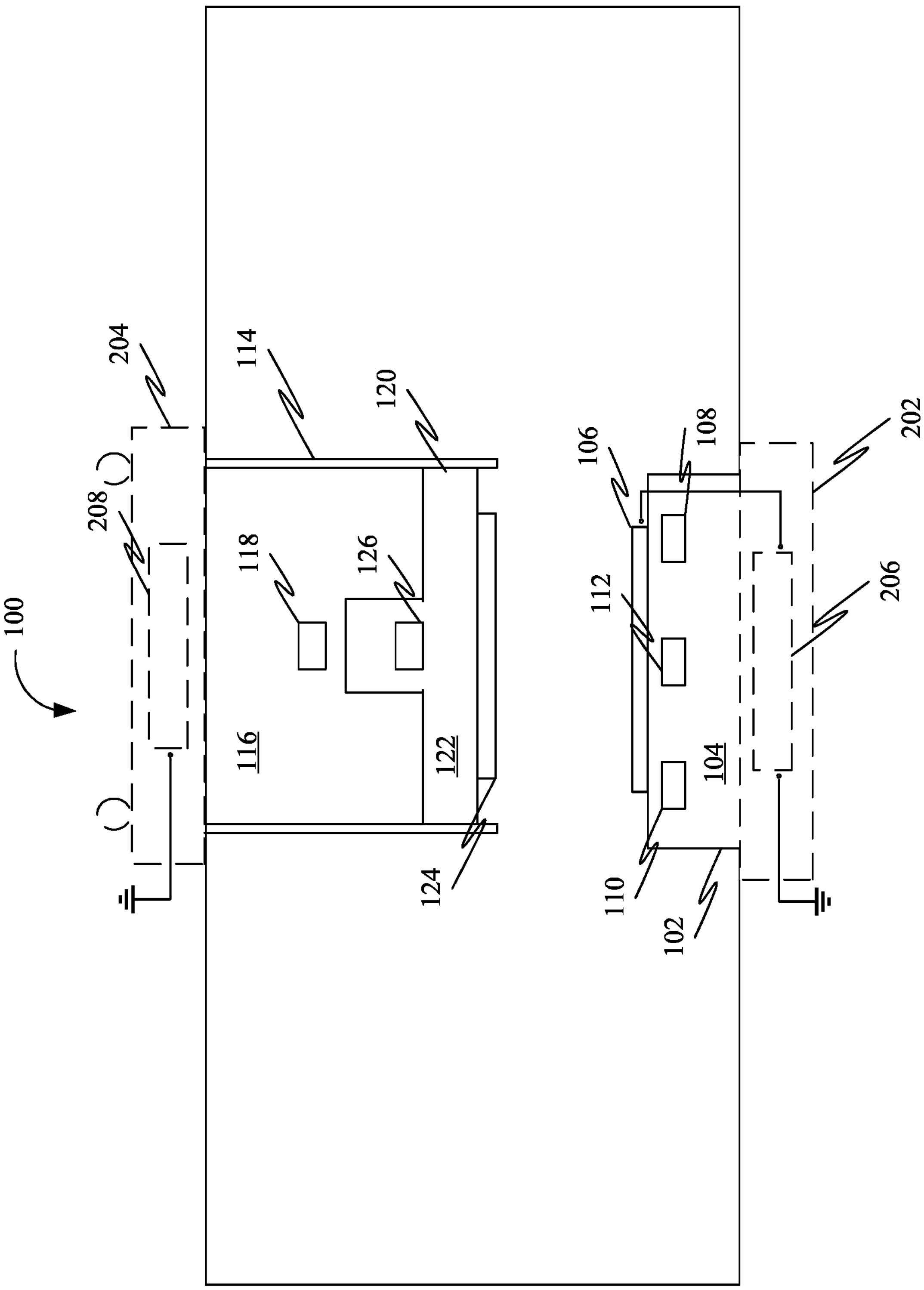
FIG. 2 shows a system for facilitating electrical connection of a first electrical unit comprised in a first object with a second electrical unit comprised in a second object, wherein the first object comprises a stationary object, in accordance with some embodiments.

In some embodiments, as shown in FIG. 2, the first object may include a stationary object 202. Further, the second object may include a mobile apparatus 204. Further, the first electrical unit may include an electrical energy source 206. Further, the second electrical unit may include a rechargeable energy source 208.

In some embodiments, the mobile apparatus 204 may include a mobile robot.

In some embodiments, each of the plurality of base magnets, including the first magnet 108, the second magnet 110 and the third magnet 112, the holder magnet 118, and the guide magnet 126 may include electromagnets.

Figure 3:
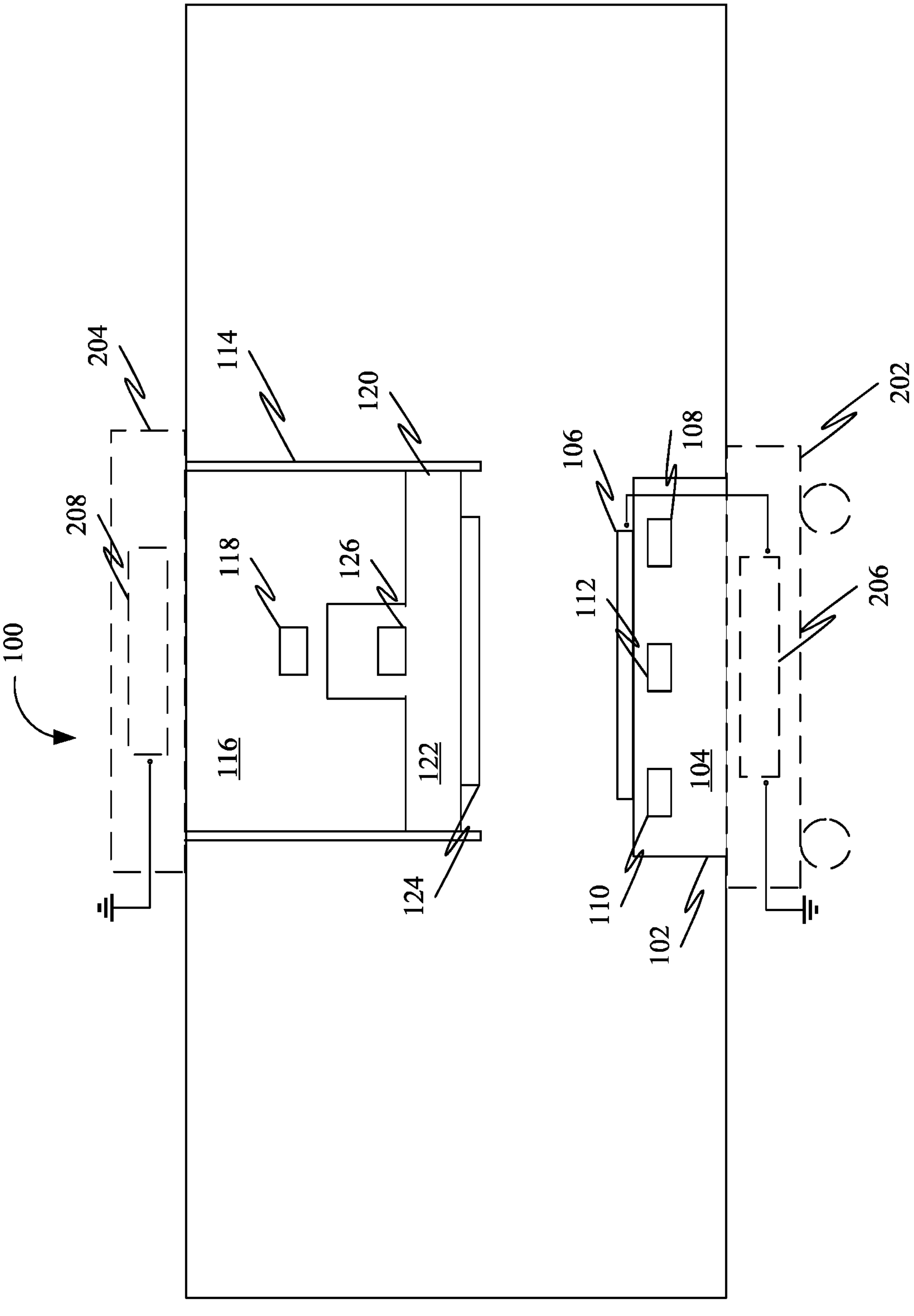
FIG. 3 shows a system for facilitating electrical connection of a first electrical unit comprised in a first object with a second electrical unit comprised in a second object, wherein the first object comprises a mobile apparatus, in accordance with some embodiments.

In some embodiments, as shown in FIG. 3, the first object may include a mobile apparatus 302. Further, the second object may include a stationary object 304. Further, the first electrical unit may include a rechargeable energy source 208. Further, the second electrical unit may include an electrical energy source 206.

Figure 4:
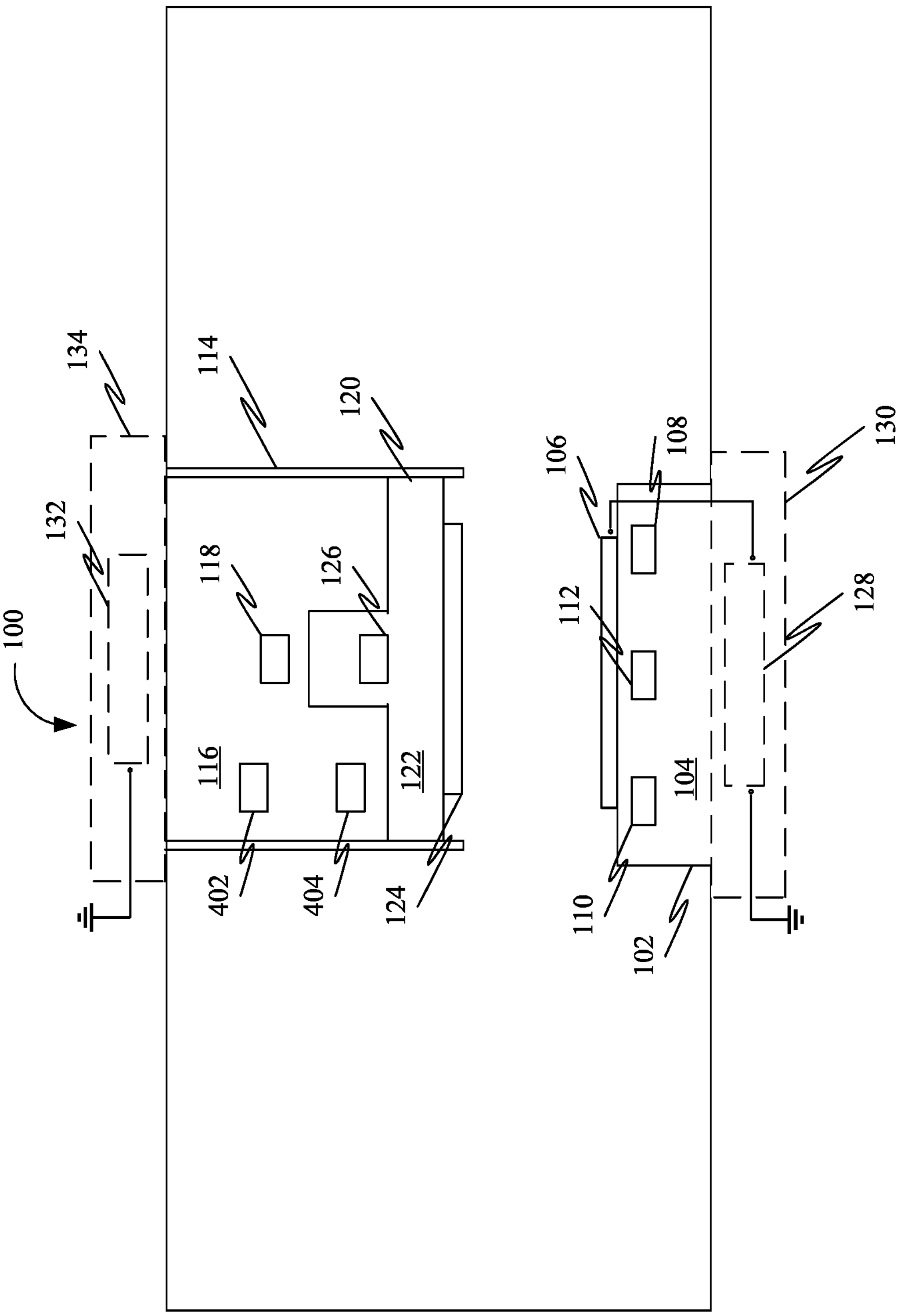
FIG. 4 shows a system for facilitating electrical connection of a first electrical unit comprised in a first object with a second electrical unit comprised in a second object, wherein the system includes a state sensor, in accordance with some embodiments.

In some embodiments, as shown in FIG. 4, the holder unit 114 may further include a state sensor 402 configured for sensing a state of the moving guide 120 within the cavity. Further, the state sensor may be configured to generate sensor data representing the state. Further, the system 100 may include a processing device 404 communicatively coupled to the state sensor 402. Further, the processing device 404 may be configured for performing at least one action based on the sensor data.

In some embodiments, the state sensor 402 may include one or more of a magnetic hall sensor and a micro-switch.

In some embodiments, at least one base magnet of the plurality of base magnets, including the first magnet 108, the second magnet 110 and the third magnet 112 may include at least one electromagnet.

In some embodiments, one or more of the holder magnet 118 and the guide magnet 126 may include at least one electromagnet.

Figure 5:
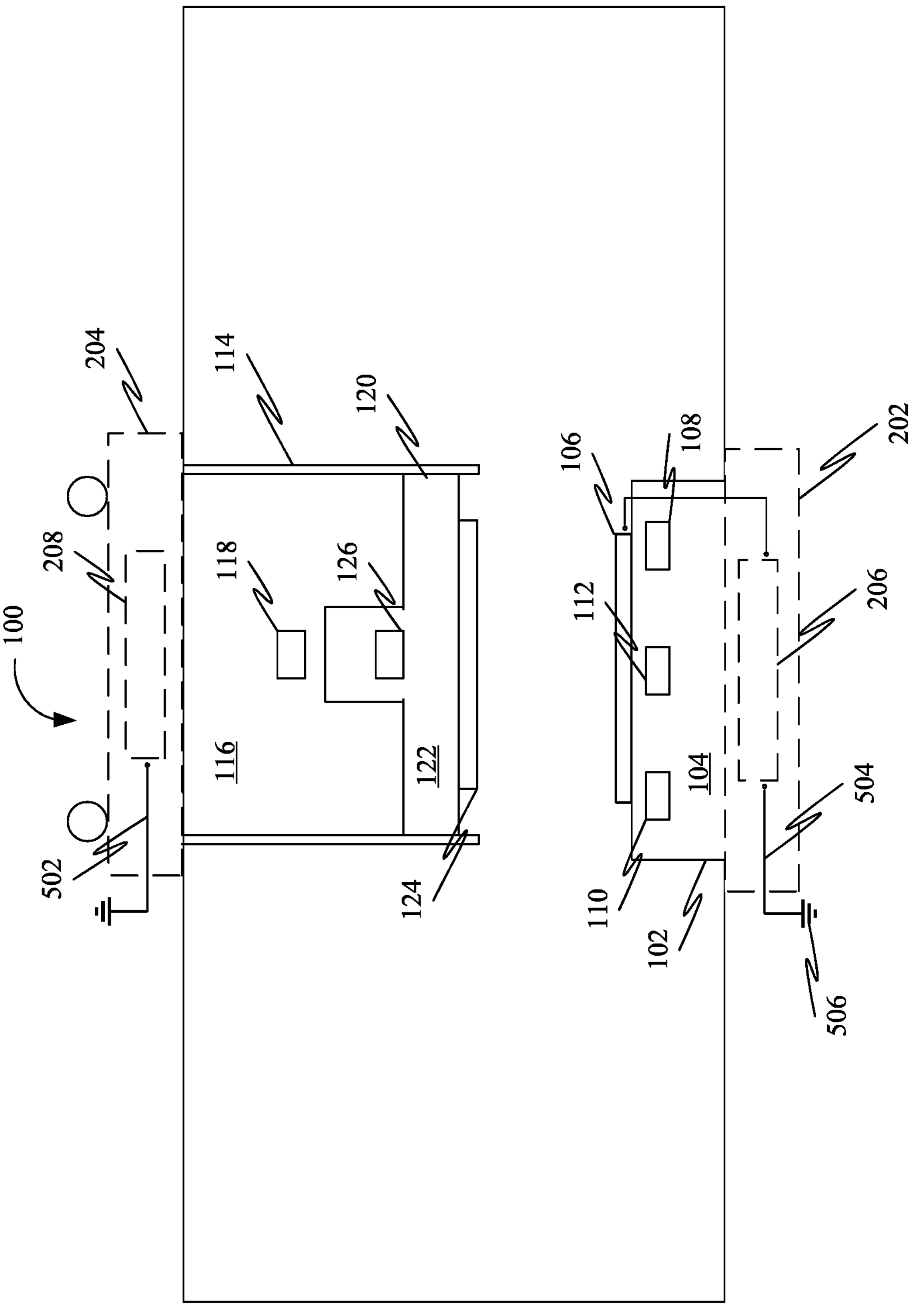
FIG. 5 shows a system for facilitating electrical connection of a first electrical unit comprised in a first object with a second electrical unit comprised in a second object, wherein the system includes ground connector, in accordance with some embodiments.

In some embodiments, as shown in FIG. 5, the second object, such as the mobile object 204 may include a ground connector 502 electrically coupled to the rechargeable energy source 208. Further, the ground connector 502 may be configured to form a physical contact with a grounding conductor 504 embedded in the first object, such as the stationary object 202. Further, a grounding terminal 506 of the electrical energy source 206 may be electrically coupled with the grounding conductor 504.

Figure 6:
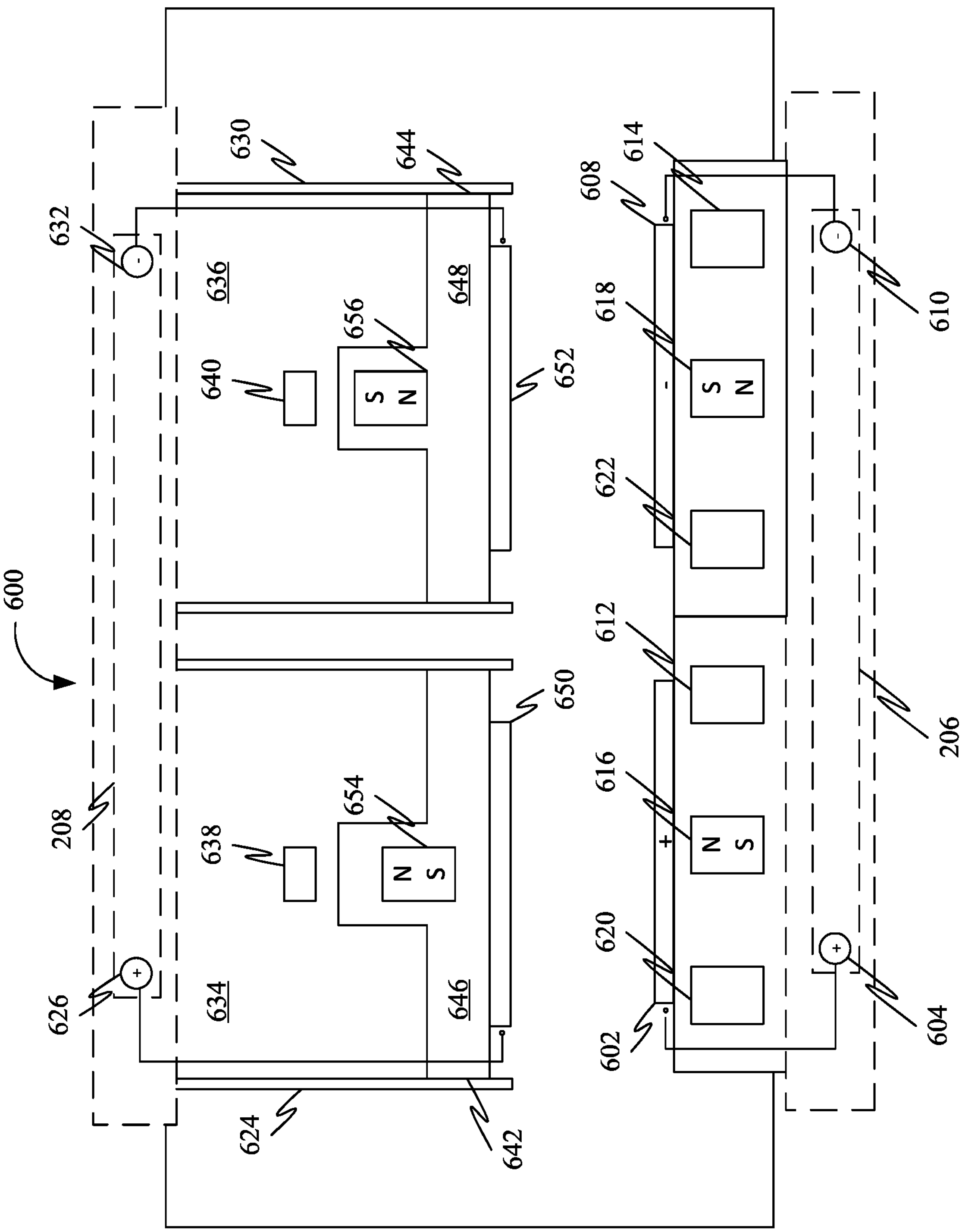
FIG. 6 shows a system for facilitating electrical connection of a first electrical unit comprised in a first object with a second electrical unit comprised in a second object, wherein the electrical connection takes place between a pair of terminals comprised in each of the first electrical unit and the second electrical unit, in accordance with some embodiments.

FIG. 6 is a system 600 for facilitating recharging of a rechargeable energy source 208, in accordance with some embodiments. In some embodiments, the base conductive pad may include a positive base conductive pad 602 electrically connected to a positive electrical terminal 604 of the electrical energy source 206 and a negative base conductive 608 pad electrically connected to the negative terminal 610 of the electrical energy source 206. Further, the plurality of base magnets may include a plurality of positive base magnets and a plurality of negative base magnets. Further, the first magnet may include a first positive magnet 612 and a first negative magnet 614. Further, the first positive magnet 612 may be disposed in a first side of the first region. Further, the first negative magnet 614 may be disposed in a second side of the first region. Further, the second magnet may include a second positive magnet 620 and a second negative magnet 622. Further, the second positive 620 magnet may be disposed in a first side of the second region. Further, the second negative magnet 622 may be disposed in a second side of the second region. Further, the third magnet may include a third positive magnet 616 and a third negative magnet 618. Further, the third positive magnet 616 may be disposed in a first side of the mid-region. Further, the third negative magnet 618 may be disposed in a second side of the mid-region. Further, the holder unit may include a positive holder unit 624 corresponding to a positive terminal 626 of the rechargeable energy source 208 and a negative holder unit 630 corresponding to a negative terminal 632 of the rechargeable energy source 208. Further, holder body may include a positive holder body 634 and a negative holder body 636. Further, the holder magnet may include a positive holder magnet 638 and a negative holder magnet 640. Further, the moving guide may include a positive moving guide 642 and a negative moving guide 644. Further, the guide body may include a positive guide body 646 and a negative guide body 648. Further, the guide conductive pad may include a positive guide conductive pad 650 and a negative guide conductive pad 652. Further, the positive guide conductive pad 650 may be electrically connected to the positive terminal 626 of the rechargeable energy source 208. Further, the negative conductive pad 652 may be electrically connected to the negative terminal 632 of the rechargeable energy source 208. Further, the guide magnet may include a positive guide magnet 654 disposed in the positive guide body 646 and a negative guide magnet 656 disposed in the negative guide body 648.

In some embodiments, the third positive magnet 616 may be disposed according to a positive attracting orientation. Further, the third negative magnet 618 may be disposed according to a negative attracting orientation. Further, the positive guide magnet 654 may be disposed in the positive attracting orientation. Further, the positive moving guide 642 may be configured to be attracted towards the third positive magnet 616. Further, the positive moving guide may be configured to be repelled away from the third negative magnet 618. Further, the negative moving guide 644 may be configured to be attracted towards the third negative magnet 618. Further, the negative moving guide 644 may be configured to be repelled away from the third positive magnet 616.

Figure 7:
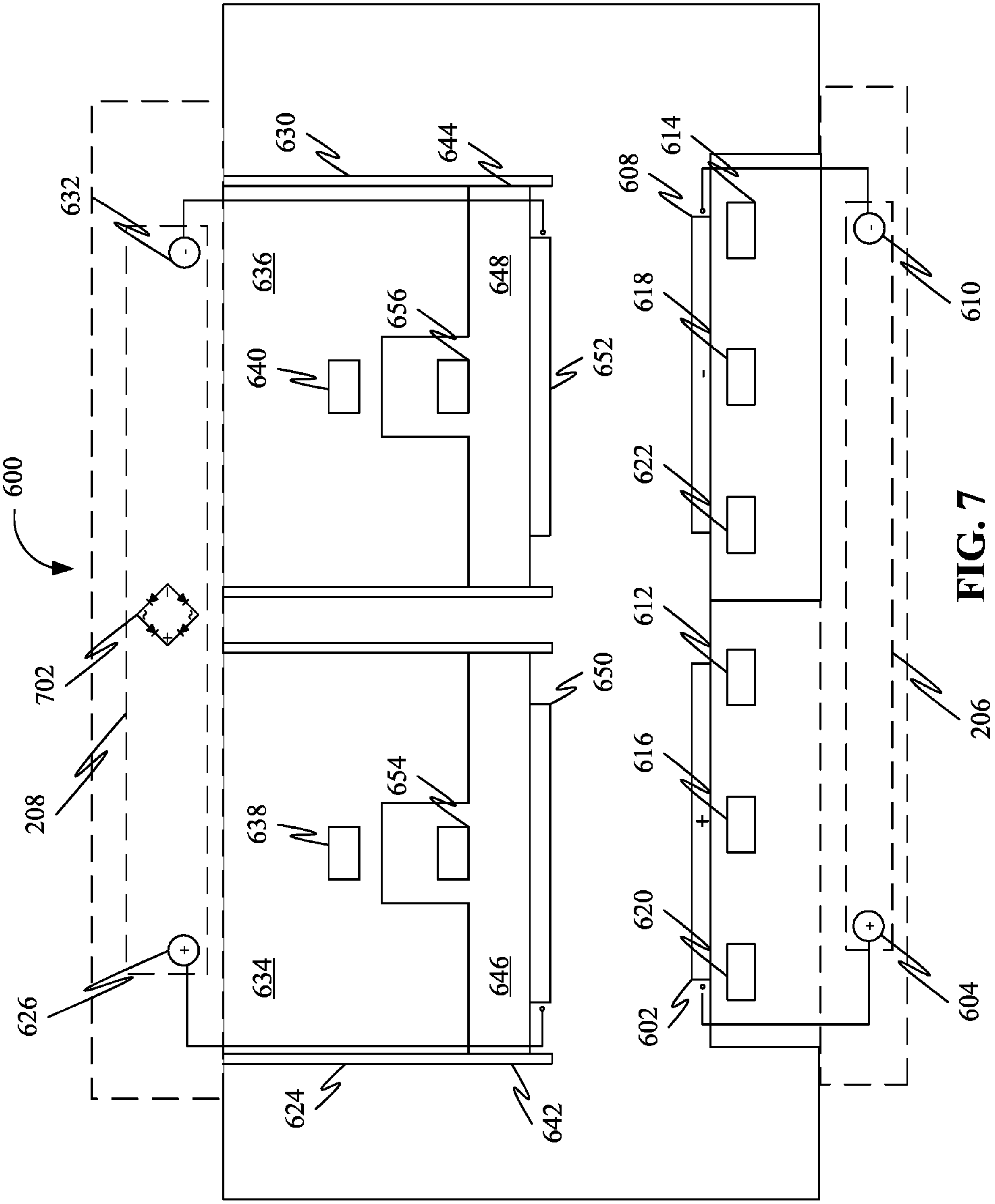
FIG. 7 shows a system for facilitating electrical connection of a first electrical unit comprised in a first object with a second electrical unit comprised in a second object, wherein the system includes a rectifier, wherein the electrical connection takes place between a pair of terminals comprised in each of the first electrical unit and the second electrical unit independent of polarity, in accordance with some embodiments.

In some embodiments, the positive guide conductive pad 650 and the negative guide conductive pad 652 may be electrically connected to the positive terminal 626 and the negative terminal 632 of the rechargeable energy 208 source through a rectifier 702, as shown in FIG. 7. Further, the rectifier 702 may be configured to deliver electrical energy to the rechargeable energy source 208 characterized by a predetermined polarity, independent of the polarity of electrical energy received from the positive guide 650 conductive pad and the negative guide conductive pad 652.

Figure 8:
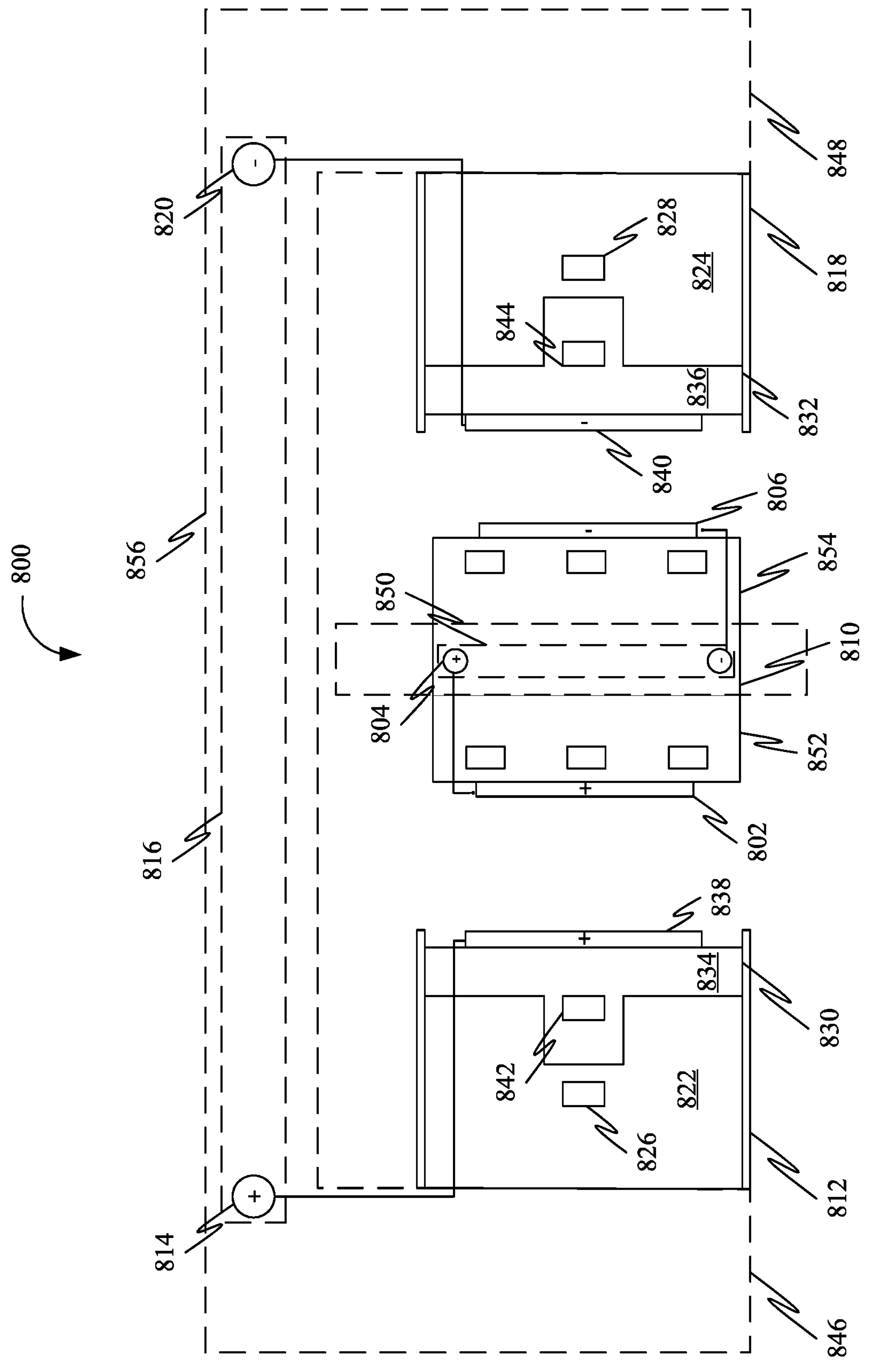
FIG. 8 shows a system for facilitating electrical connection of a first electrical unit comprised in a first object with a second electrical unit comprised in a second object, wherein the electrical connection takes place between a pair of terminals comprised in each of the first electrical unit and the second electrical unit, wherein the pair of terminals on the base body are disposed on either sides (i.e. a left side and a right side) of the base body, in accordance with some embodiments.

FIG. 8 is a system 800 for facilitating charging of a rechargeable energy source comprised in a mobile apparatus 856, in accordance with some embodiments.

In some embodiments, the base conductive pad may include a positive base conductive pad 802 electrically connected to a positive electrical terminal 804 of the electrical energy source 850 and a negative base conductive pad 806 electrically connected to the negative terminal 808 of the electrical energy source 850. Further, the positive base conductive pad 802 may be disposed on a left side 852 of the base body 810 and the negative base conductive pad may be disposed on a right side 854 of the base body 810. Further, the holder unit may include a positive holder unit 812 corresponding to a positive terminal 814 of the rechargeable energy source 816 and a negative holder unit 818 corresponding to a negative terminal 820 of the rechargeable energy source 816. Further, holder body may include a positive holder body 822 and a negative holder body 824. Further, the holder magnet may include a positive holder magnet 826 and a negative holder magnet 828. Further, the moving guide may include a positive moving guide 830 and a negative moving guide 832. Further, the guide body may include a positive guide body 834 and a negative guide body 836. Further, the guide conductive pad may include a positive guide conductive pad 838 and a negative guide conductive pad 840. Further, the positive guide conductive pad 838 may be electrically connected to the positive terminal 814 of the rechargeable energy source 816. Further, the negative conductive pad 840 may be electrically connected to the negative terminal 820 of the rechargeable energy source 816. Further, the guide magnet may include a positive guide magnet 842 disposed in the positive guide body 834 and a negative guide magnet 844 disposed in the negative guide body 836. Further, the positive holder unit 812 may be disposed on a first side 846 of the mobile apparatus 856 and the negative holder unit 818 may be disposed on a second side 848 of the mobile apparatus 856. Further, the positive moving guide 830 in the retracted position may be configured to form a physical contact between the positive guide conductive pad 838 and the positive base conductive pad 802. Further, the negative moving guide 832 in the retracted position may be configured to form a physical contact between the negative guide conductive pad 840 and the negative base conductive pad 806.

Figure 9:
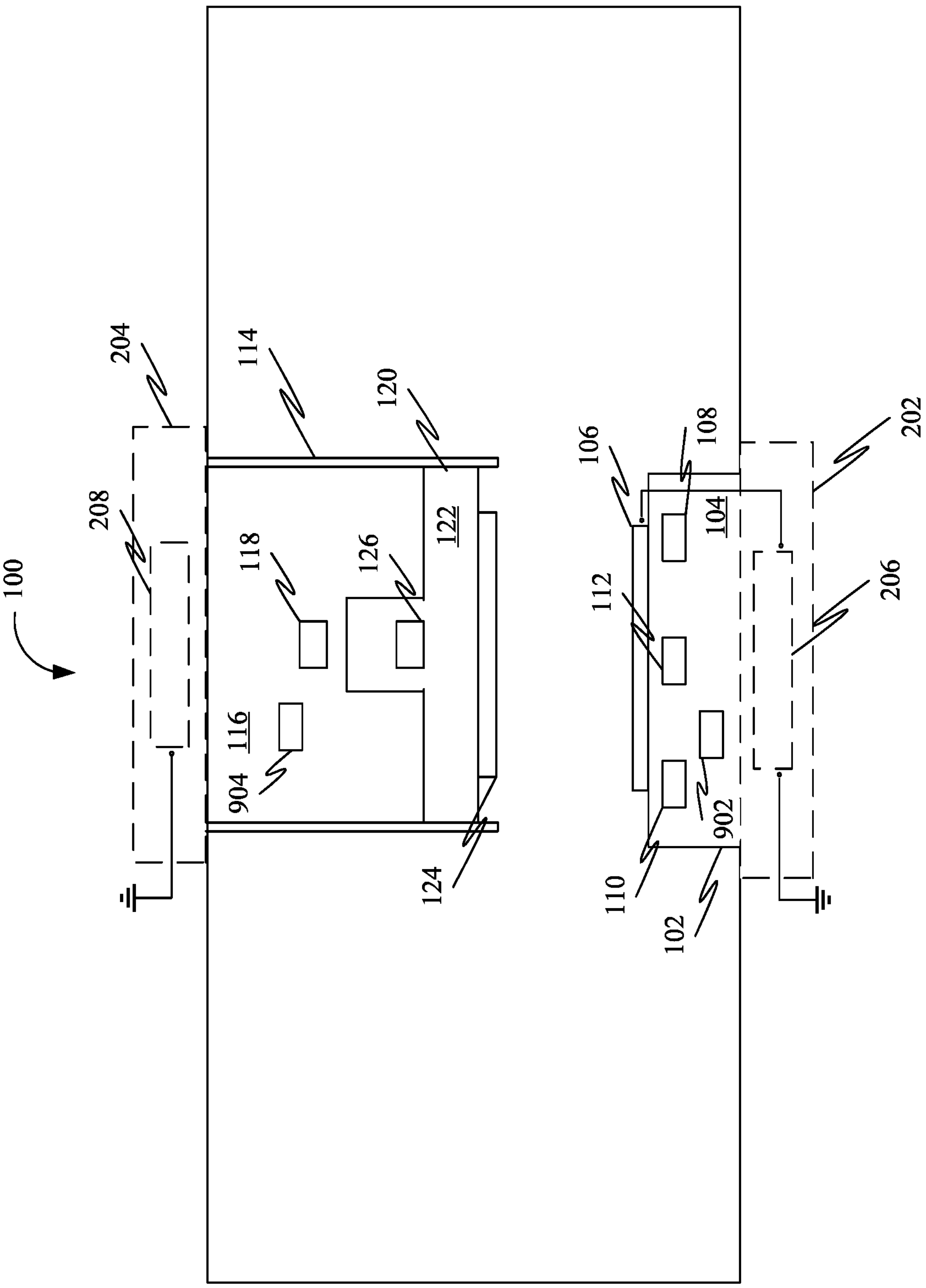
FIG. 9 shows a system for facilitating electrical connection of a first electrical unit comprised in a first object with a second electrical unit comprised in a second object, wherein the system includes a base processing device and a holder processing device, in accordance with some embodiments.

In some embodiments, as shown in FIG. 9, the system 100 may further include a base processing device 902 configured for controlling electrical energy provided to the plurality of base magnets. Further, the system 100 may include a holder processing device 904 configured for controlling electrical energy provided to one or more of the holder magnet 118 and the guide magnet 126.

Figure 10:
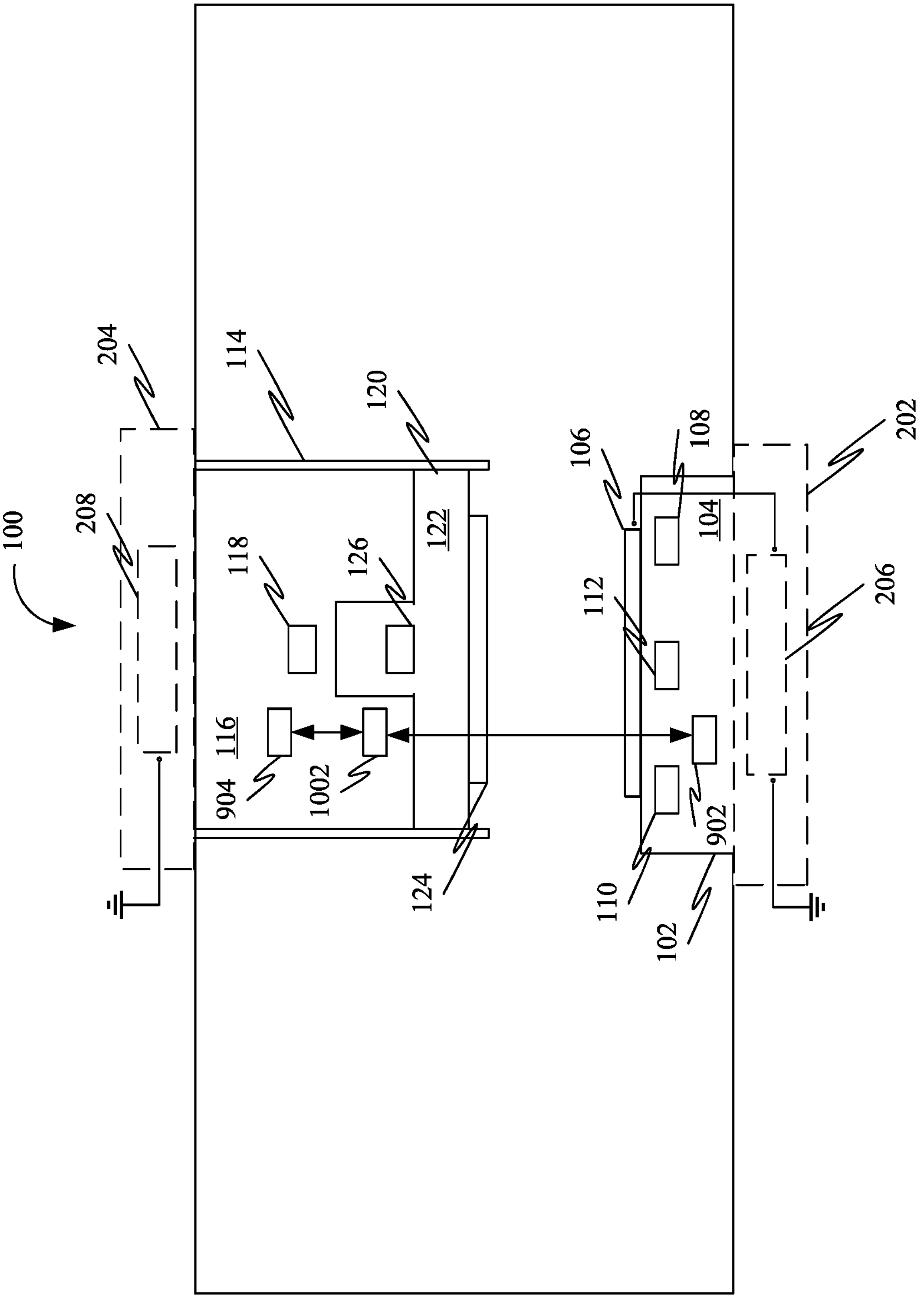
FIG. 10 shows a system for facilitating electrical connection of a first electrical unit comprised in a first object with a second electrical unit comprised in a second object, wherein the system includes a proximity sensor, in accordance with some embodiments.

In some embodiments, as shown in FIG. 10, the system 100 may further include a proximity sensor 1002 configured for detecting a proximity of the mobile apparatus to the base unit 102. Further, the proximity sensor 1002 may be communicatively coupled to one or more of the base processing device 902 and the holder processing device 904. Further, the base processing device 902 may be configured for controlling electrical energy provided to the plurality of base magnets based on detecting the proximity. Further, the holder processing device 904 may be configured for controlling electrical energy provided to one or more of the holder magnet 118 and the guide magnet 126 based on detecting the proximity.

Figure 11:
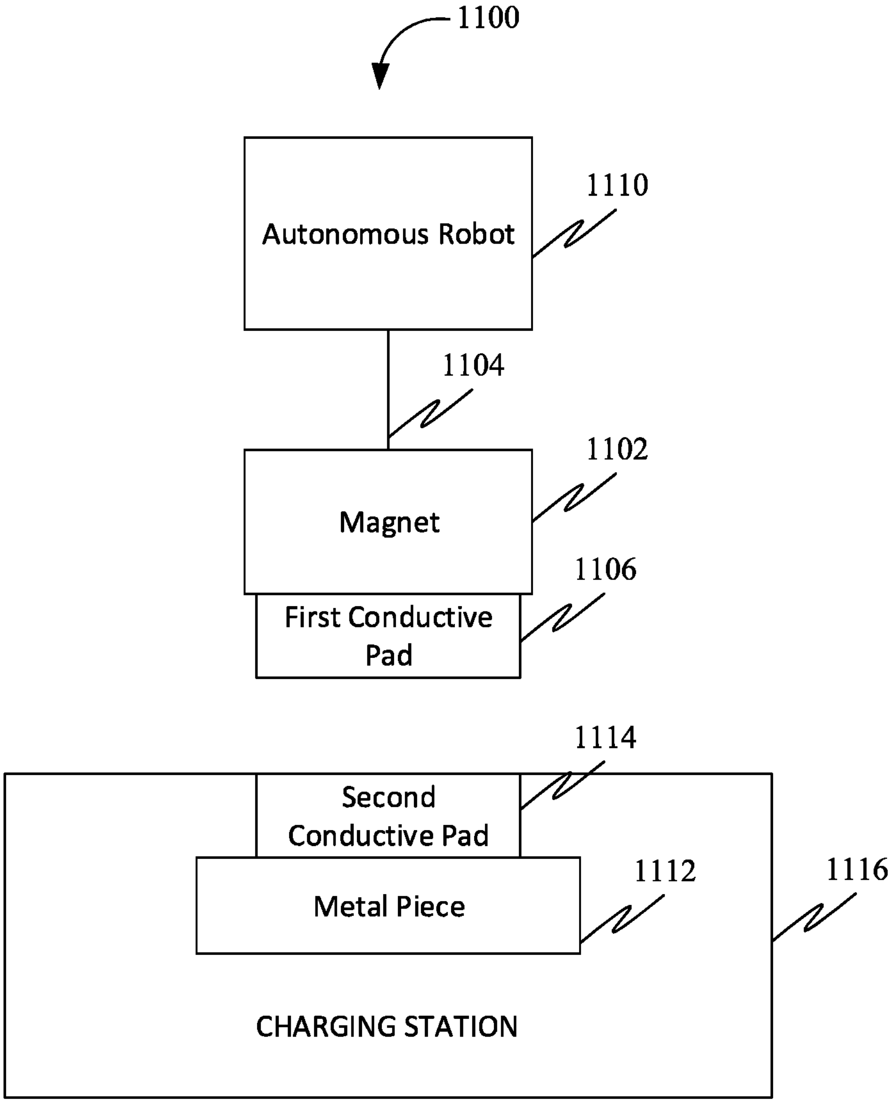
FIG. 11 is a block diagram of a system to facilitate a secure connection between a charging station and an autonomous robot while charging, in accordance with one embodiment.

FIG. 11 is a block diagram of a system 1100 to facilitate a secure connection between a charging station and an autonomous robot while charging, in accordance with an embodiment. Accordingly, the system 1100 may include a magnet 1102, a spring 1104, and a first conductive pad 1106. The magnet 1102 may be connected to an autonomous robot 1110 using the spring 1104 which may have a spring constant 'k'. Further, the magnet 1102 and the spring may 1104 be housed in a retractable housing. The retractable housing and components of the system 1100 such as the spring 1104 and the magnet 1102 may be attached to the autonomous robot 1110 in a manner so as not to hinder the movement of the autonomous robot 1110. Without an external force, the spring 1104 and the magnet 1102 may be in an equilibrium state where the spring 1104 may be in a least stretched position, and the retractable housing may, therefore, be in a retracted state. The magnet 1102 may be attached to the first conductive pad 1106, which may include an electrical contact area to charge the autonomous robot 1110. The first conductive pad 1106 may be a solid material in the shape of a square or a rectangle which may absorb heat and allow the electricity to pass through the first conductive pad 1106. The first conductive pad 1106 may be made up of a conduction material such as, but not limited to, copper, silver, graphene, and so on. Further, gold plating or beryllium copper may also be used on the conductive pad 1106. Further, the system 1100 may include a metal piece 1112 and a second conductive pad 1114 which may be a part of a charging station 1116. The charging station 1116 may be connected to an electrical outlet. The metal piece 1112 may be made up of one or more metals such as, but not limited to, iron, nickel, cobalt, some alloys of rare-earth metals, and so on possessing magnetic properties. Further, the second conductive pad 1114 may also include an electrical contact area to charge the autonomous robot. The second conductive pad 1114 may be attached over the surface of the metal piece 1112. The second conductive pad 1114 may be made up of a conduction material such as, but not limited to, copper, silver, graphene, and so on. Further, gold plating or beryllium copper may also be used in the second conductive pad 1114. Further, to begin charging, the autonomous robot 1110 may move and position over the charging station 1116. Accordingly, the magnetic property of the magnet 1102 may generate an attractive force causing the magnet 1102 to be attracted to the fixed metal piece 1112. Further, the attractive force may stretch the spring 1104 more than usual, thereby, making the spring lose the state of equilibrium, and cause the retractable housing to be extended. Accordingly, the electrical contacts on the first conductive pad 1106 and the second conductive pad 1114 may come in connect. The attractive force may be strong enough to stop the spring 1104 from retracting and going back to the equilibrium state. Further, to stop charging, the autonomous robot 1110 may simply move away from the charging station 1116, leading the spring 1104 to return to the equilibrium state and the retractable housing to retract.

Further, in an embodiment, the magnet 1102 may be an electromagnet, that may be turned on when the autonomous robot 1110 is positioned over the charging station 1116. Further, when the electromagnet is turned off, the magnet 1102 may not exert the force of attraction, and the retractable housing may return to the retracted position.

Figure 12:
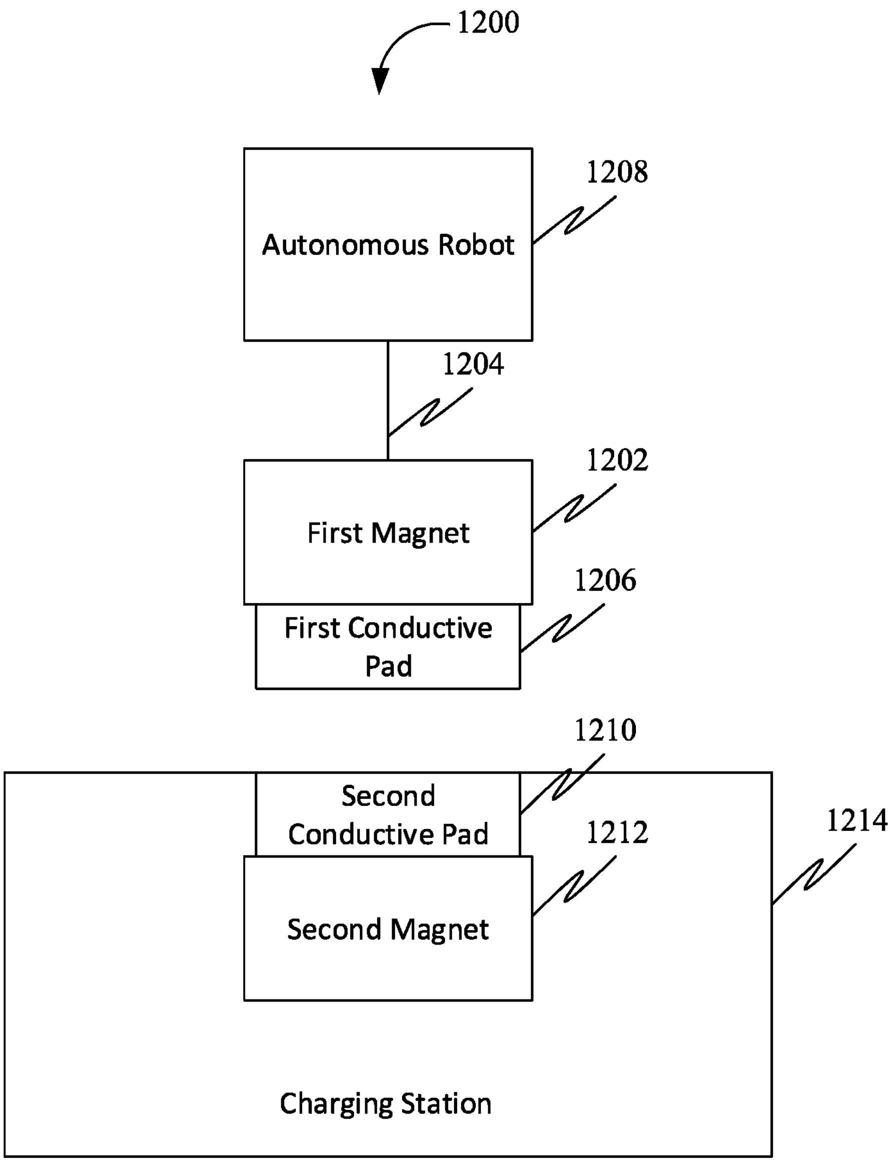
FIG. 12 illustrates a block diagram of the system to facilitate a secure connection between a charging station and an autonomous robot while charging using a pair of magnets, in accordance with some embodiments.

FIG. 12 is a block diagram of a system 1200 to facilitate a secure connection between a charging station and an autonomous robot while charging using a pair of magnets, in accordance with some embodiments. Accordingly, the system 1200 may include a first magnet 1202, a spring 1204, and a first conductive pad 1206. The first magnet 1202 may be connected to an autonomous robot 1208 using the spring 1204. Further, the spring 1204 may have a spring constant 'k'. The autonomous robot 1208 may consist of one or more wheels. The components of the system 1200 such as the spring 1204 and the first magnet 1202 may be housed in a retractable housing. The retractable housing and components of the system 1200, such as the spring 1204 and the first magnet 1202 may be attached to the autonomous robot 1208 in such a way so as to not hinder the movement of the autonomous robot 1208. Further, the first magnet 1202 may be a permanent magnet. Without an external force, the spring 1204 and the first magnet 1202 may be in an equilibrium state where the spring 1204 may be in a least stretched position, and the retractable housing therefore, may be in a retracted state. The first magnet 1202 may be attached to the first conductive pad 1206. Further, the first conductive pad 1206 may include an electrical contact area to charge the autonomous robot 1208. The first conductive pad 1206 may be made up of a solid material in the shape of a square or a rectangle which may absorb heat and allow electricity to pass through the first conductive pad 1206. Further, the system 1200 may include a second magnet 1212 and a second conductive pad 1210 which may be a part of a charging station 1214. The charging station 1214 may be connected to an electrical outlet. The second magnet 1212 may be a permanent magnet. Further, the second conductive pad 1210 may also include an electrical contact area to charge the autonomous robot 1208. Further, the second conductive pad 1210 may be attached over the surface of the second magnet 1212. Further, to begin charging, the autonomous robot 1208 may move and position over the charging station 1214. Accordingly, the second magnet 1212 may be aligned such that the north pole of the first magnet 1202 may face the south pole of the second magnet 1212 and vice versa. The opposite polarity may generate a force of attraction between the first magnet 1202 and the second magnet 1212. Further, the attractive force may stretch the spring 1204 more than usual, thereby, making the spring 1204 lose the state of equilibrium, and cause the retractable housing to be extended. Accordingly, the electrical contacts on the first conductive pad 1206 and the second conductive pad 1210 may come in connect with each other. The attractive force may be strong enough to stop the spring 1204 from retracting and going back to the equilibrium state. Further, to stop charging, the autonomous robot 1208 may simply move away from the charging station 1214, leading the spring 1204 to return to the equilibrium state and the retractable housing to retract.

Further, in an embodiment, the second magnet 1212 may be an electromagnet whose polarity may be changed, leading to a force of repulsion between the first magnet and the second magnet 1212. Accordingly, the spring 1204 may return to the equilibrium state and the retractable housing may return to the retracted position.

Figure 13:
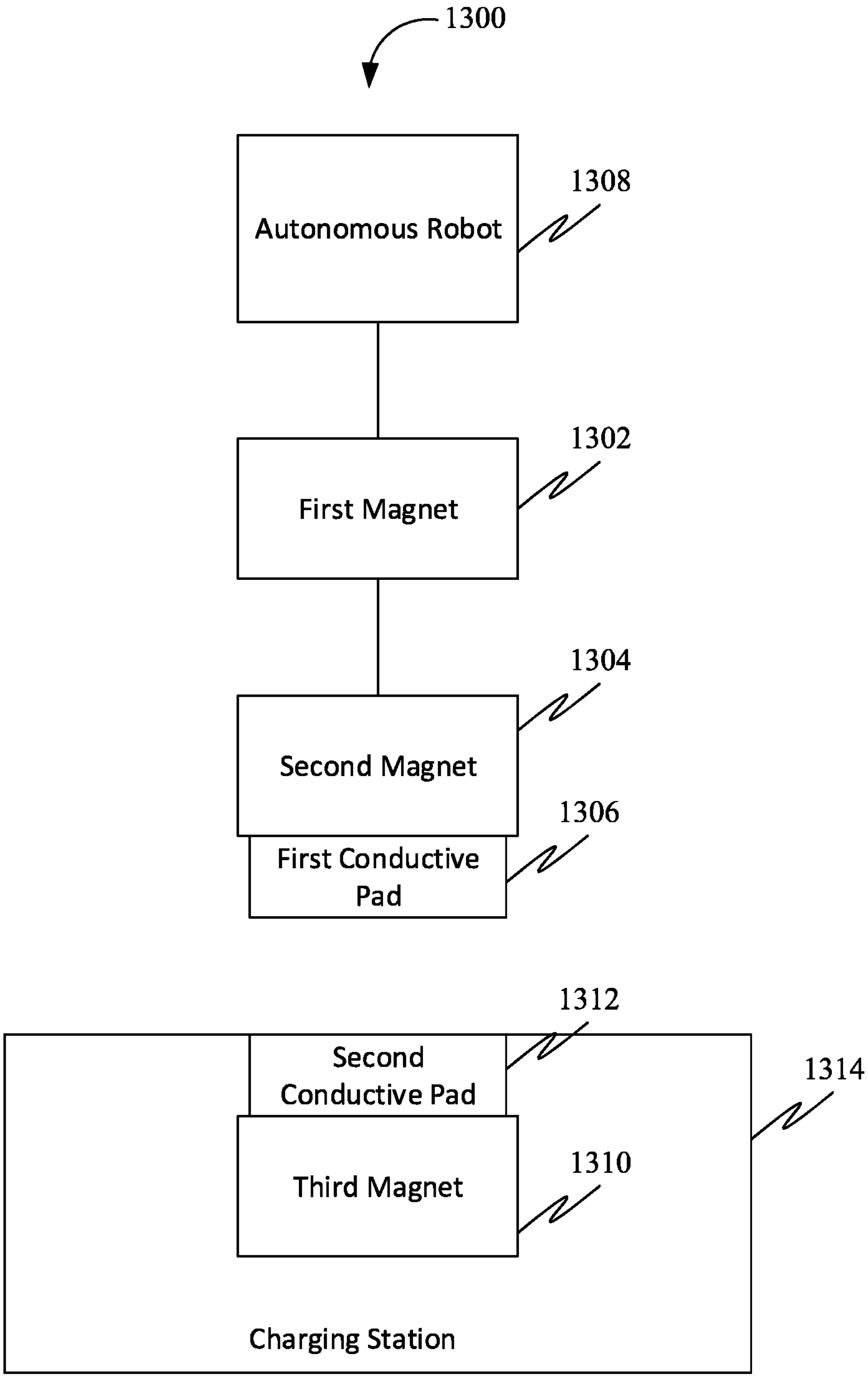
FIG. 13 illustrates a block diagram of the system to facilitate a secure connection between a charging station and an autonomous robot while charging using one or more magnets, in accordance with some embodiments.

FIG. 13 is a block diagram of a system 1300 to facilitate a secure connection between a charging station and an autonomous robot while charging using one or more magnets, in accordance with some embodiments. Further, the system 1300 may include a first magnet and a second magnet. Further, the first magnet 1302 and second magnet 1304 may be housed in a retractable housing. The retractable housing and components of the system 1300 such as the first magnet 1302 and second magnet 1304 may be attached to an autonomous robot 1308 in such a way that the movement of autonomous robot 1308 may not be hindered. Further, first magnet 1302 and second magnet 1304 may be permanent magnets. The first magnet 1302 and second magnet 1304 may be separated by a thin layer of a filler material. The filler material may be made up of one or more non-metallic elements such as, but not limited to, carbon, sulfur, non-reactive elements, and so on. The magnets may be aligned in such a way that polarity of first magnet 1302 is opposite to polarity of second magnet 1304. For instance, the south pole of first magnet 1302 may face the north pole of second magnet 1304. The opposite polarity may generate an attractive force and may bring the first magnet 1302 and second magnet 1304 closer but due to the presence of the filler material, first magnet 1302 and second magnet 1304 may not come in contact. The filler material may decrease the force of attraction between first magnet 1302 and second magnet 1304, thereby, keeping first magnet 1302 and second magnet 1304 in a retracted state. The second magnet 1304 may be attached to a first conductive pad 1306 that may include electrical contact area to charge the autonomous robot 1308. The first conductive pad 1306 may be made of a solid material in the shape of a square or a rectangle which may absorb heat and allow the electricity to pass through the first conductive pad 1306.

Further, the system 1300 may include a third magnet 1310 and a second conductive pad 1312 that may be a part of a charging station 1314. The charging station 1314 may be connected to an electrical outlet. The third magnet 1310 may be an electromagnet stronger than first magnet 1302, the polarity of which may be controllable. Further, the second conductive pad 1312 may also include electrical contact area to charge the autonomous robot 1308. The second conductive pad 1312 may be attached over the surface of the third magnet 1310. Accordingly, without the action of an external force, first magnet 1302 and second magnet 1304 may be in an equilibrium state, and the retractable housing may be retracted. Further, to begin charging, the autonomous robot 1308 may move and position over the charging station 1314. Accordingly, the third magnet 1310 may be turned on so that the north pole of the second magnet 1304 may face the south pole of the third magnet 1310 and vice versa. The opposite polarity may generate a force of attraction the second magnet 1304 and the third magnet 1310. Further, the attractive force may lead to the retractable housing to be extended. Accordingly, the electrical contacts on the first conductive pad 1306 and the second conductive pad 1312 may come in connect with each other. The attractive force between second magnet 1304 and third magnet 1310 may increase exponentially as the distance between second magnet 1304 and third magnet 1310 decreases, whereas, the attractive force between first magnet 1302 and second magnet 1304 may decrease exponentially as the distance between first magnet 1302 and second magnet 1304 increases. Accordingly, the second magnet 1304 may not go back to the retracted state with first magnet 1302.

Further, to stop charging, the autonomous robot 1308 may simply move away from the charging station 1314, leading the first magnet 1302 and second magnet 1304 to return to the equilibrium state and the retractable housing to retract.

Further, in an embodiment, the polarity of the third magnet 1310 may be changed. leading to a force of repulsion between the second magnet 1304 and the third magnet 1310. Accordingly, retractable housing may return to the retracted position.

Figure 14:
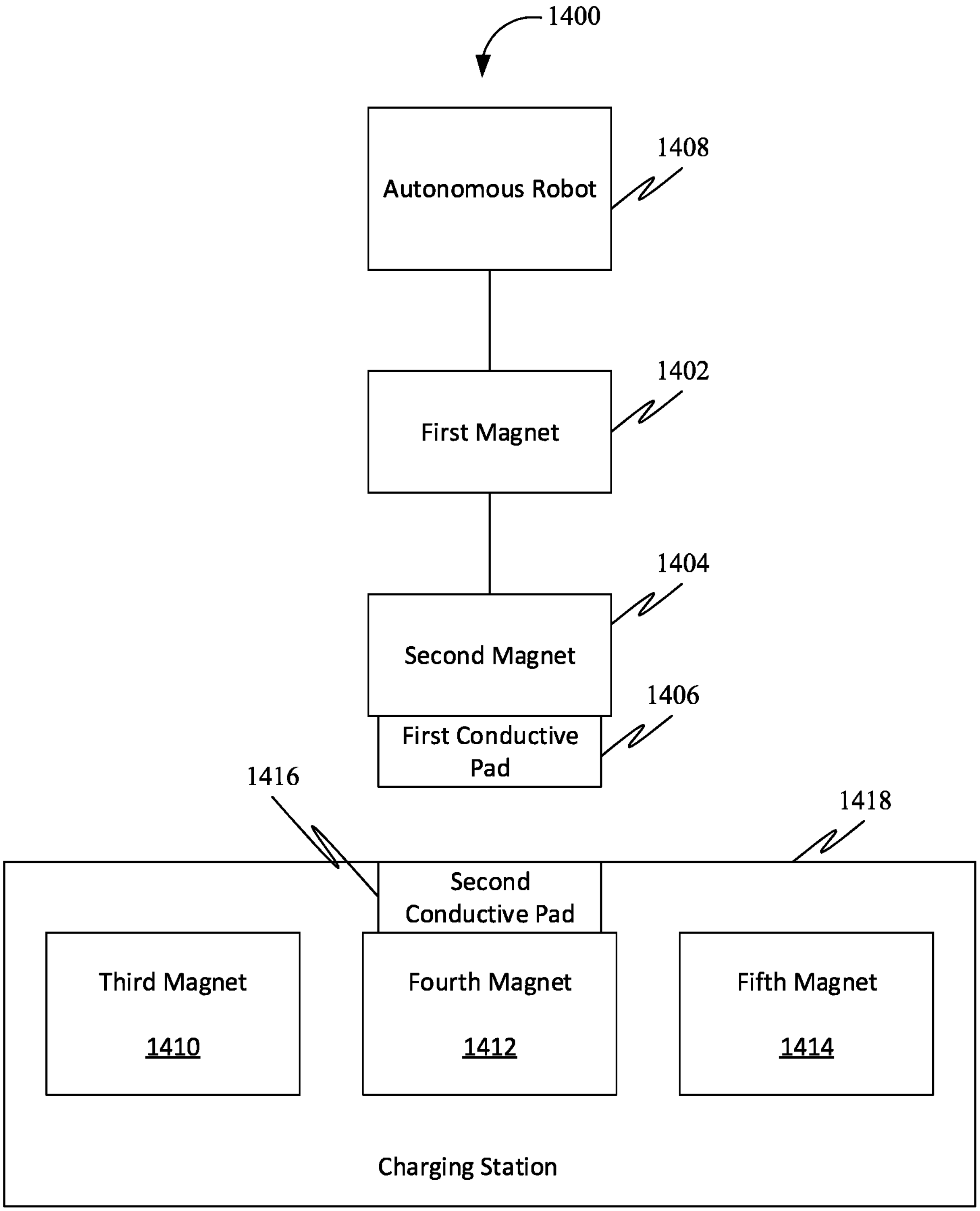
FIG. 14 illustrates a block diagram of the system to facilitate a secure connection between a charging station and an autonomous robot while charging using a plurality of magnets, in accordance with some embodiments.

FIG. 14 is a block diagram of a system 1400 to facilitate a secure connection between a charging station and an autonomous robot while charging using a plurality of magnets, in accordance with some embodiments. The system 1400 may include a first conductive pad 1406, a first magnet 1402 and a second magnet 1404. The first magnet 1402 and second magnet 1404 may be housed in a retractable housing. The retractable housing and the first magnet 1402 and second magnet 1404 may be attached to the autonomous robot 1408 in such a way that the movement of autonomous robot 1408 may not be hindered. Further, the first magnet 1402 and second magnet 1404 may be permanent magnets. The first magnet 1402 and the second magnet 1404 may be separated by a thin layer of a filler material. The filler material may be made up of one or more non-metallic elements such as, but not limited to, carbon, sulfur, non-reactive elements, and so on. The first magnet 1402 and the second magnet 1404 may be aligned in such a way that polarity of the first magnet 1402 may be opposite to polarity of the second magnet 1404. For instance, the south pole of first magnet 1402 may face the north pole of the second magnet 1404. The opposite polarity may generate an attractive force and may bring the first magnet 1402 and the second magnet 1404 closer but due to the presence of the filler material, the first magnet 1402 and the second magnet 1404 may not come in contact. The filler material may decrease the force of attraction between the first magnet 1402 and the second magnet 1404, thereby, keeping the first magnet 1402 and the second magnet 1404 in a retracted state. The second magnet may be attached to the first conductive pad 1406 that may include an electrical contact area to charge the autonomous robot 1408. The first conductive pad 1406 may be made of a solid material in the shape of a square or a rectangle which may absorb heat and allow electricity to pass through the first conductive pad 1406. Further, the system 1400 may include a third magnet 1410, a fourth magnet 1412, a fifth magnet 1414, and a second conductive pad 1416 that may be a part of a charging station 1418. The charging station 1418 may be connected to an electrical outlet. The fourth magnet 1412 may be a permanent magnet stronger than the first magnet 1402 and the second magnet 1404, and may be aligned so as to attract the second magnet 1404. Further, the third magnet 1410 and the fifth magnet 1414 may be permanent magnets stronger than the first magnet 1402 and the second magnet 1404 and may be aligned to repel the second magnet 1404. Further, the second conductive pad 1416 may also include electrical contact area to charge the autonomous robot 1408. The second conductive pad 1416 may be attached over the surface of the magnet 14. Accordingly, without the action of an external force, the first magnet 1402 and the second magnet 1404 may be in an equilibrium state, and the retractable housing may be retracted. Further, to begin charging, the autonomous robot 1408 may move and position over the charging station 1418. The autonomous may be brought in contact with the base station from any direction. In an instance, when the autonomous robot 1408 moves in from a side, the autonomous robot 1408 may encounter the fifth magnet 1414 and due to the same polarity between the fifth magnet 1414 and the second magnet 1404, a force of repulsion that may keep the second magnet 1404 in retracted position with the first magnet 1402 may be generated. However, as the autonomous robot 1408 may move into position, the opposite polarity of the second magnet 1404 and the fourth magnet 1412 may generate a force of attraction. Accordingly, the force of attraction may increase with a decrease in distance between the second magnet 1404 and the magnet 14. Further, the attractive force may lead to the retractable housing to be extended. Accordingly, the electrical contacts on the first conductive pad 1406 and the second conductive pad 1416 may come in contact with each other. The attractive force may be strong enough to stop the first magnet 1402 and the second magnet 1404 retracting and going back to the equilibrium state.

Further, to stop charging, the autonomous robot 1408 may move away. Accordingly, the third magnet 1410 and the second magnet 1404 may repel, and the force of repulsion may cause the retractable housing to return to the retracted position.

Further, in an embodiment, the system 1400 may facilitate the autonomous robot 1408 to detect the charging station 1418 located when the autonomous robot 1408 may be in the vicinity of the charging station 1418. For instance, the charging station 1418 may include a homing beacon, such as a Bluetooth Low Energy (BLE) beacon. Accordingly, the beacon may constantly transmit BLE signals, which may be received by a BLE receiver, located in the autonomous robot 1408, and may allow the autonomous robot 1408 to detect a location of the charging station 1418. Further, in an instance, the system 1400 may allow for the detection of a nearby charging station 1418 through additional mechanisms, such as through magnetic tracks, laser-guided tracks, or even through computer-aided vision.

Figure 15:
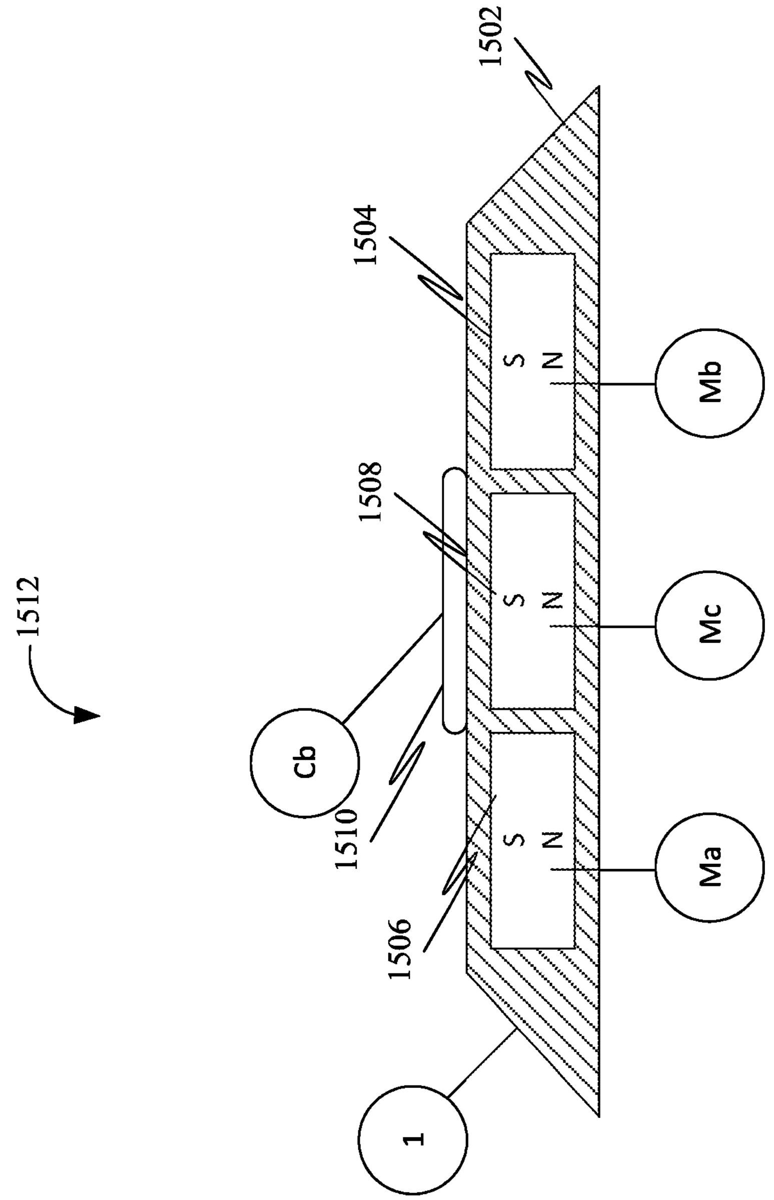
FIG. 15 illustrates a base component of a system to facilitate a secure connection between a charging station and a mobile device while charging using a plurality of magnets, in accordance with an exemplary embodiment.
Figure 16:
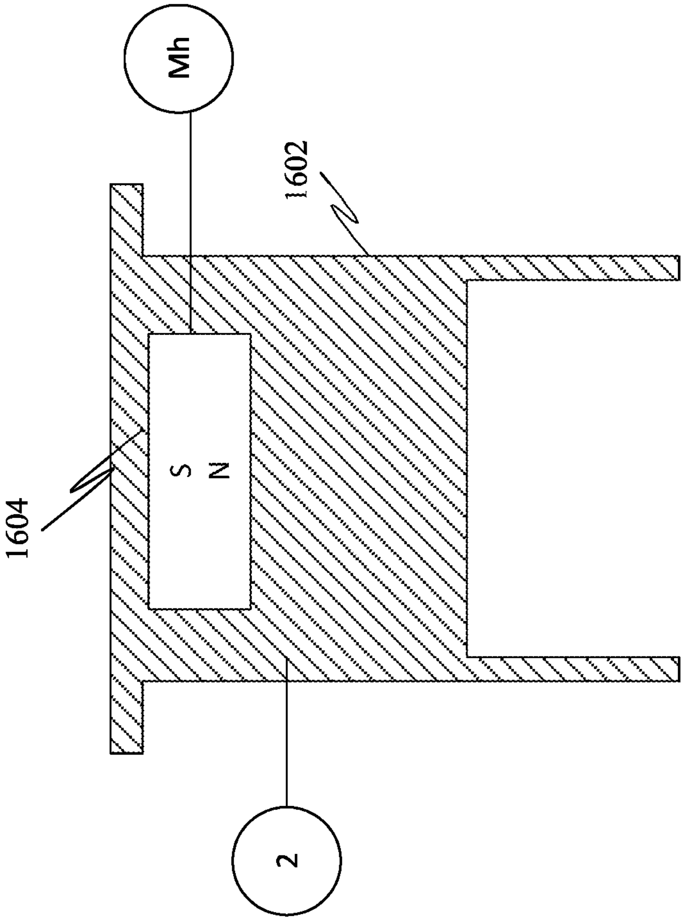
FIG. 16 illustrates a holder component of a system to facilitate a secure connection between a charging station and a mobile device while charging using a plurality of magnets, in accordance with an exemplary embodiment.
Figure 17:
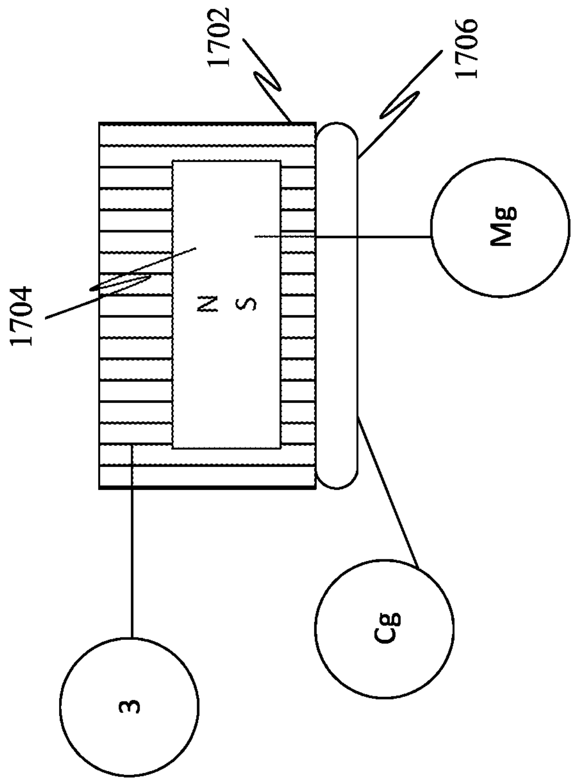
FIG. 17 illustrates a guide component of a system to facilitate a secure connection between a charging station and a mobile device while charging using a plurality of magnets, in accordance with an exemplary embodiment.
Figure 18:
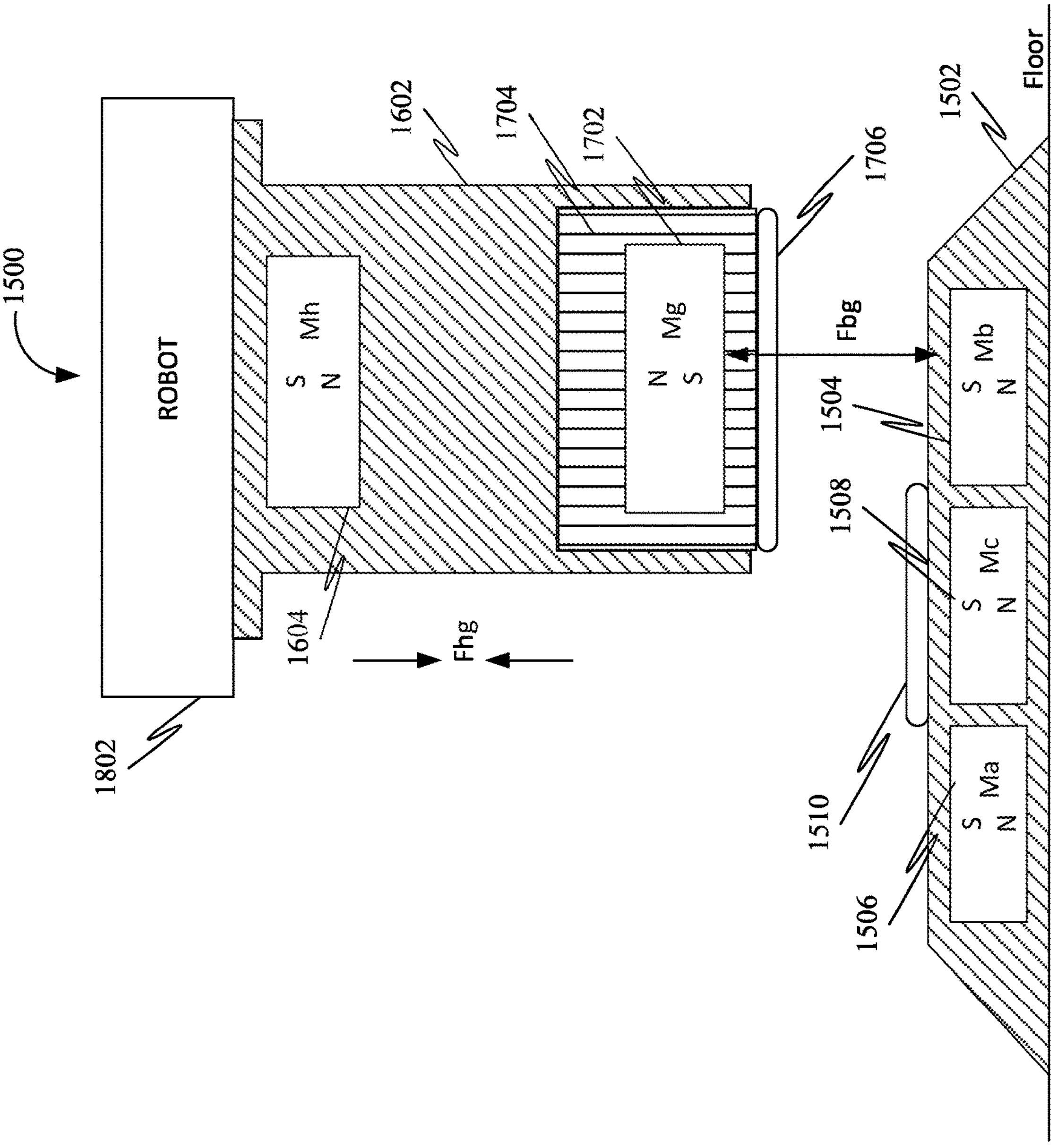
FIG. 18. is a system to facilitate a secure connection between a charging station and an autonomous robot while charging using a plurality of magnets, in accordance with some embodiments.
Figure 19:
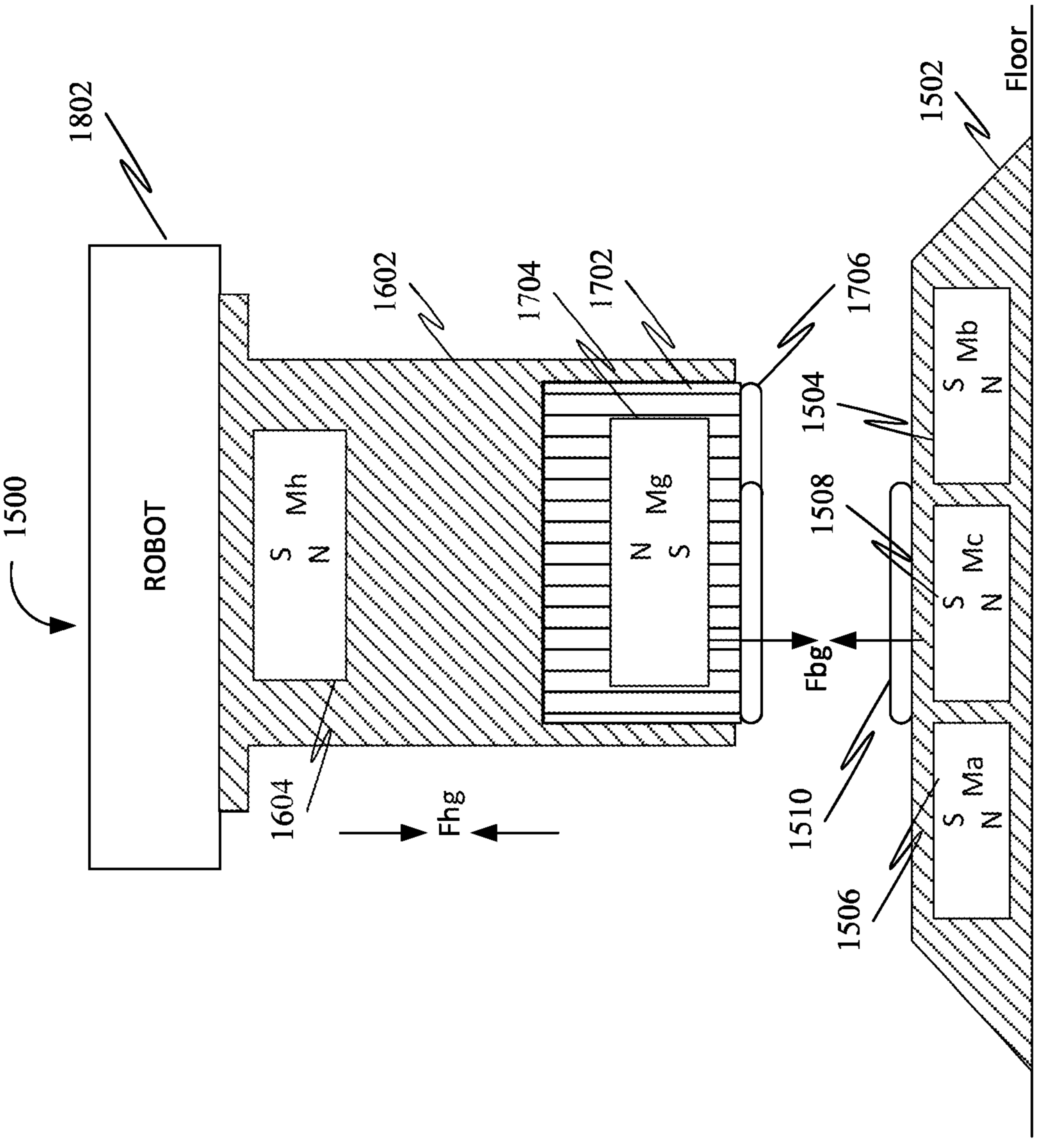
FIG. 19 illustrates the interaction of an autonomous robot with the base platform to facilitate the charging of the autonomous robot using one or more magnets, in accordance with an exemplary embodiment.
Figure 20:
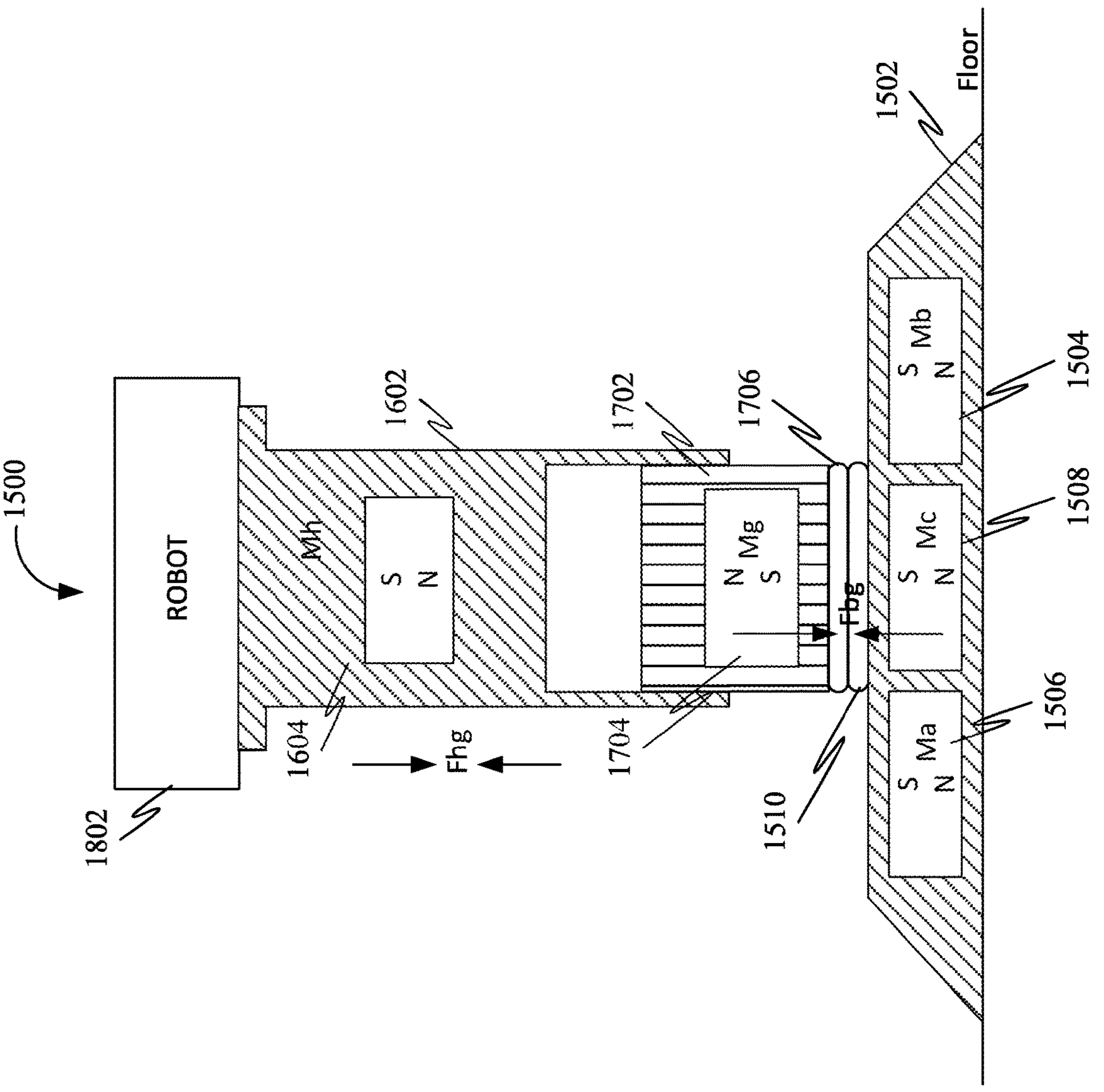
FIG. 20 illustrates the interaction of the autonomous robot with the base platform to facilitate the charging of the autonomous robot using one or more magnets, in accordance with an exemplary embodiment.
Figure 21:
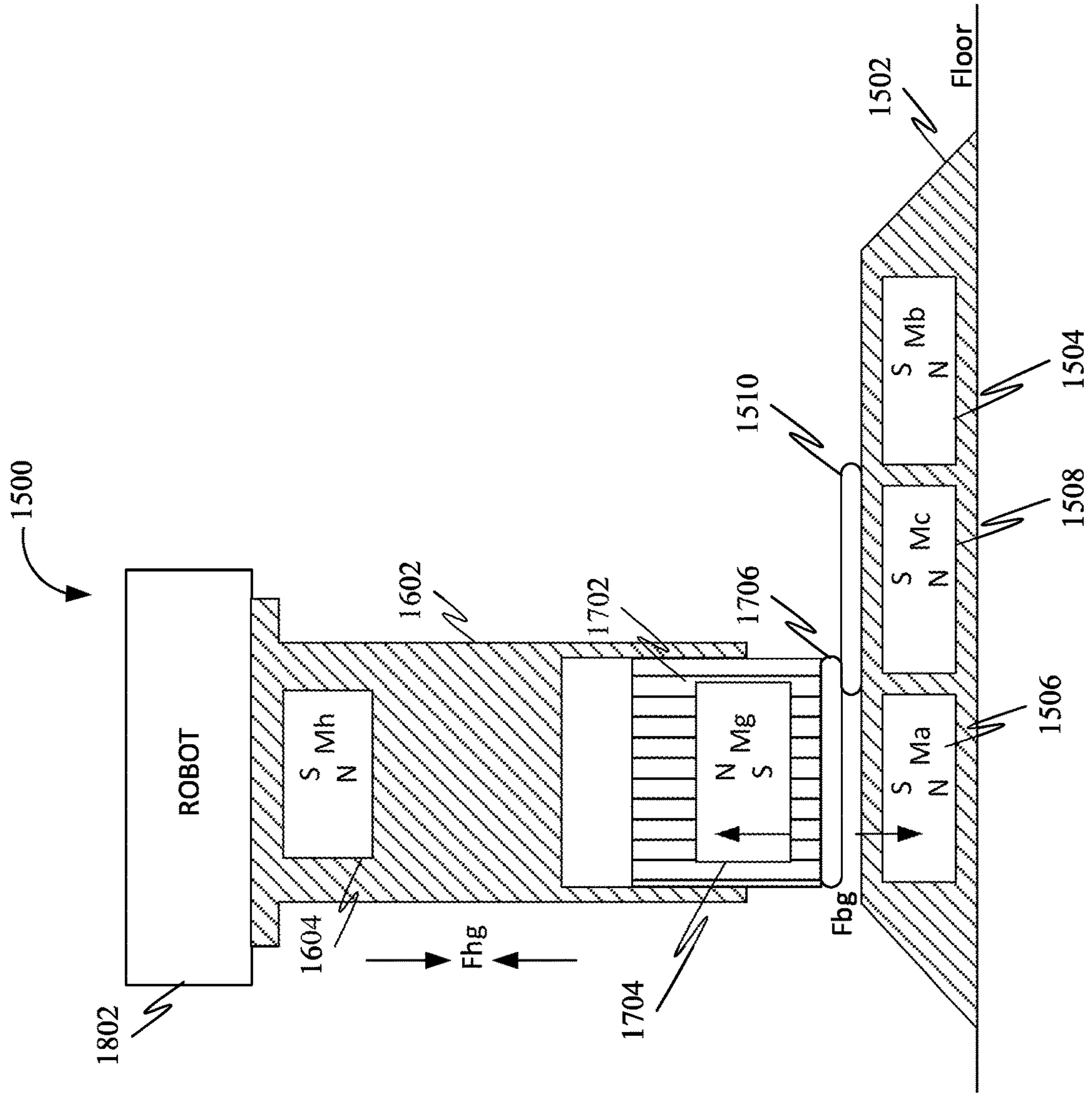
FIG. 21 illustrates the interaction of the autonomous robot with the base platform using one or more magnets, in accordance with an exemplary embodiment.
Figure 22:
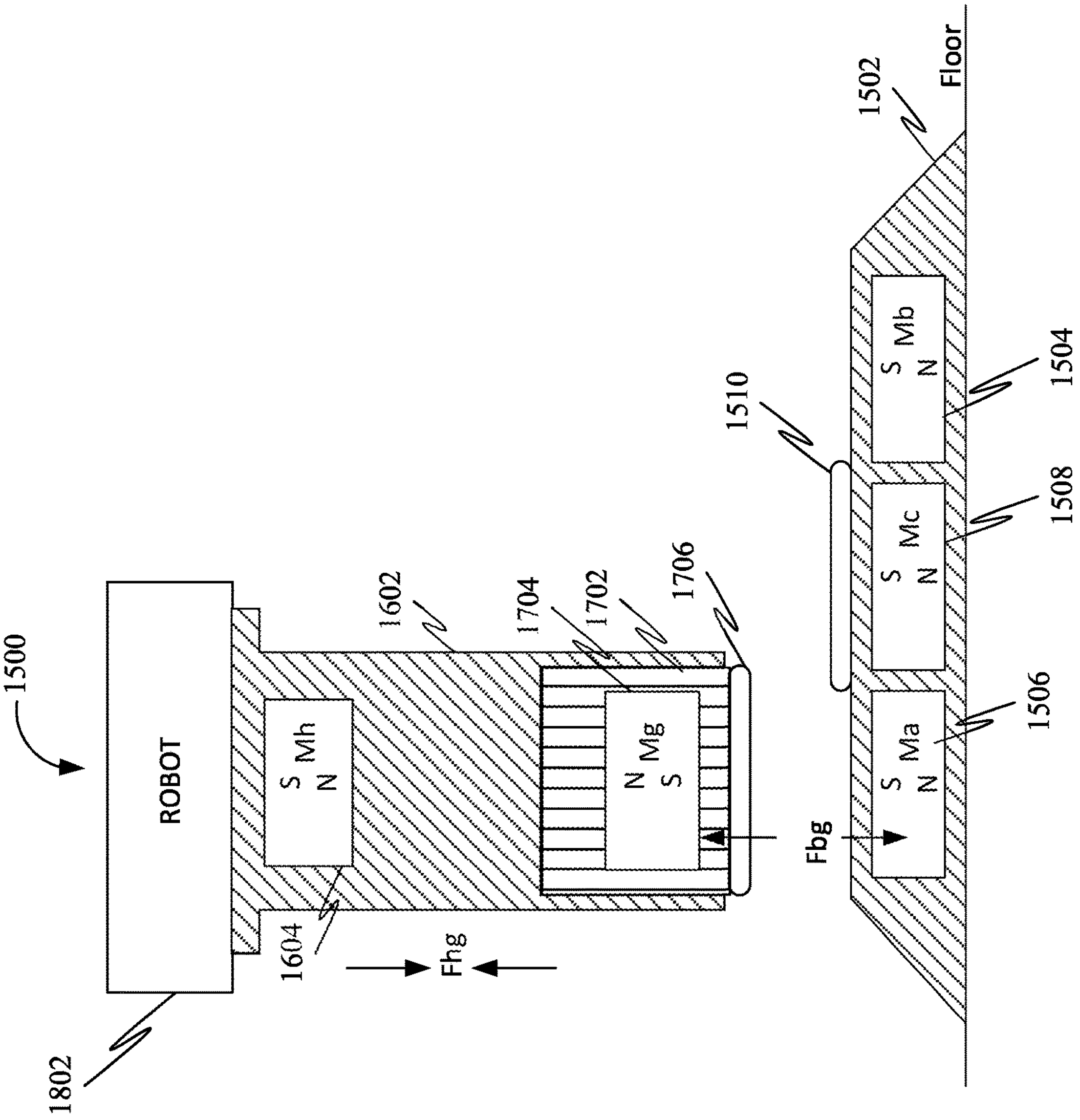
FIG. 22 illustrates the interaction of the autonomous robot with the base platform using one or more magnets, in accordance with an exemplary embodiment.

FIG. 15 shows an exemplary charging station 1512 of a system 1500 (as shown in FIG. 18) to facilitate a secure connection between a charging station and a mobile device while charging using a plurality of magnets, in accordance with some embodiments. Further, the charging station 1512 may include a base 1502 containing a first magnet 1506 (Ma), a second magnet 1504 (Mb), a third magnet 1508 (Mc) and a first electric conductive pad 1510 (Cb) as shown in. Further, the system 1500 may include a holder 1602 which may contain a fourth magnet 1604 (Mh), as shown in FIG. 16. Further, the system 1500 may include a guide 1702 containing a fifth magnet 1704 (Mg) and a second electric conductive pad 1706 (Cg), as shown in FIG. 17. The guide 1702 may move inside the holder 1602. The base 1502 may typically be attached directly or indirectly to the floor. The holder 1602 and guide 1702 may typically be mounted on a battery operated mobile unit, such as a robot 1802 (as shown in FIG. 18), a wheelchair, or an electric vehicle. Further, when the robot 1802 may be away from the base 1502, the guide 1702 may be pulled into the holder 1602 by an attractive force Fhg of the fifth magnet 1704 and the fourth magnet 1604. When fully retracted, the distance between the fifth magnet 1704 and the fourth magnet 1604 may purposely be large, such that the force Fhg may be strong enough to keep the guide 1702 retracted, but weak enough to be overcome. When approaching the base 1502 from the left or from the right, the polarity of the first magnet 1506 or the second magnet 1504 may cause a repulsive force Fbg against the fifth magnet 1704 that may push the guide 1702 into the holder 1602. Since the guide 1702 may already be retracted, no effect may be visible. When reaching the center of the base 1502, and the fifth magnet 1704 may be over the third magnet 1508, the fifth magnet 1704 and the third magnet 1508 may be subjected to attractive force Fbg. Since the fifth magnet 1704 may be closer to the second magnet 1504 than to the fourth magnet 1604, the attractive Fbg may be greater than the pulling force Fhg exerted by the fourth magnet 1604. The guide 1702 may extent towards the base 1502. As the base 1502 extends, the attractive force Fbg may increase exponentially while the pulling force Fhg exerted by the fourth magnet 1604 may decrease by the same exponential rate as shown in FIG. 19. Further, as shown in FIG. 20, the first electric conductive pad 1510 and the second electric conductive pad 1706 may be held firmly together by the attractive force Fbg between the fifth magnet 1704 and the third magnet 1508. The very high contact pressure may ensure a high-quality conduction, allowing higher current to be carried than alternative mating techniques using springs. Further, as the robot 1802 moves away from the third magnet 1508, the fifth magnet 1704 may reach the first magnet 1506 or the second magnet 1504, as shown in FIG. 21. The polarity of the first magnet 1506 or the second magnet 1504 against the fifth magnet 1704 may cause a repulsive force Fbg which may push the guide 1702 into the holder 1602. Further, the fifth magnet 1704 may also be simultaneously pulled by the fourth magnet 1604 with the force Fhg that may increase as the fifth magnet 1704 and the fourth magnet 1604 may come closer. The combined push and pull action may cause a very fast and clean disconnection between the first electric conductive pad 1510 and the second electric conductive pad 1706 as shown FIG. 22.

Figure 23:
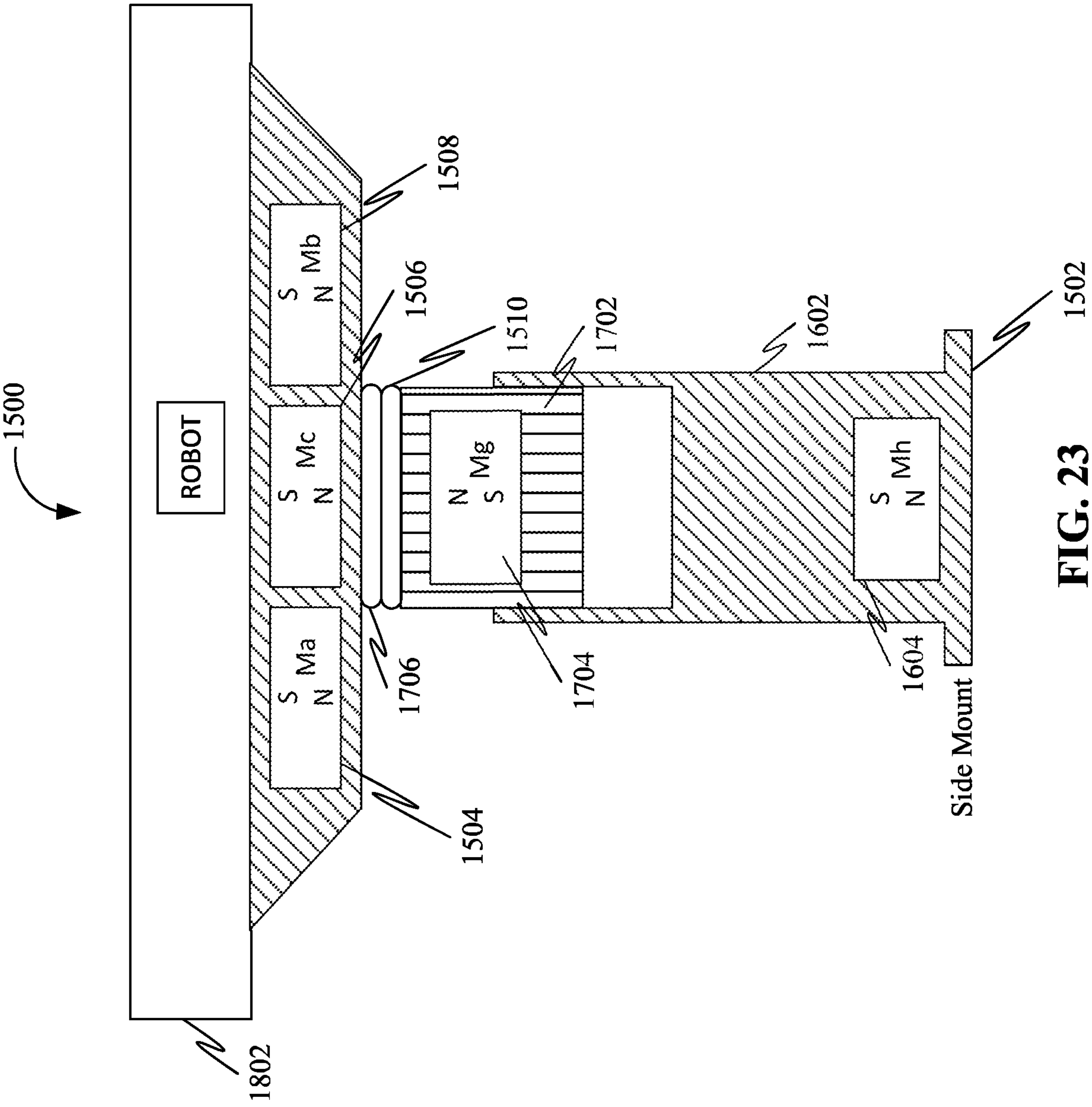
FIG. 23 illustrates the interaction of the autonomous robot with a guide and holder, in accordance with an exemplary embodiment.
Figure 24:
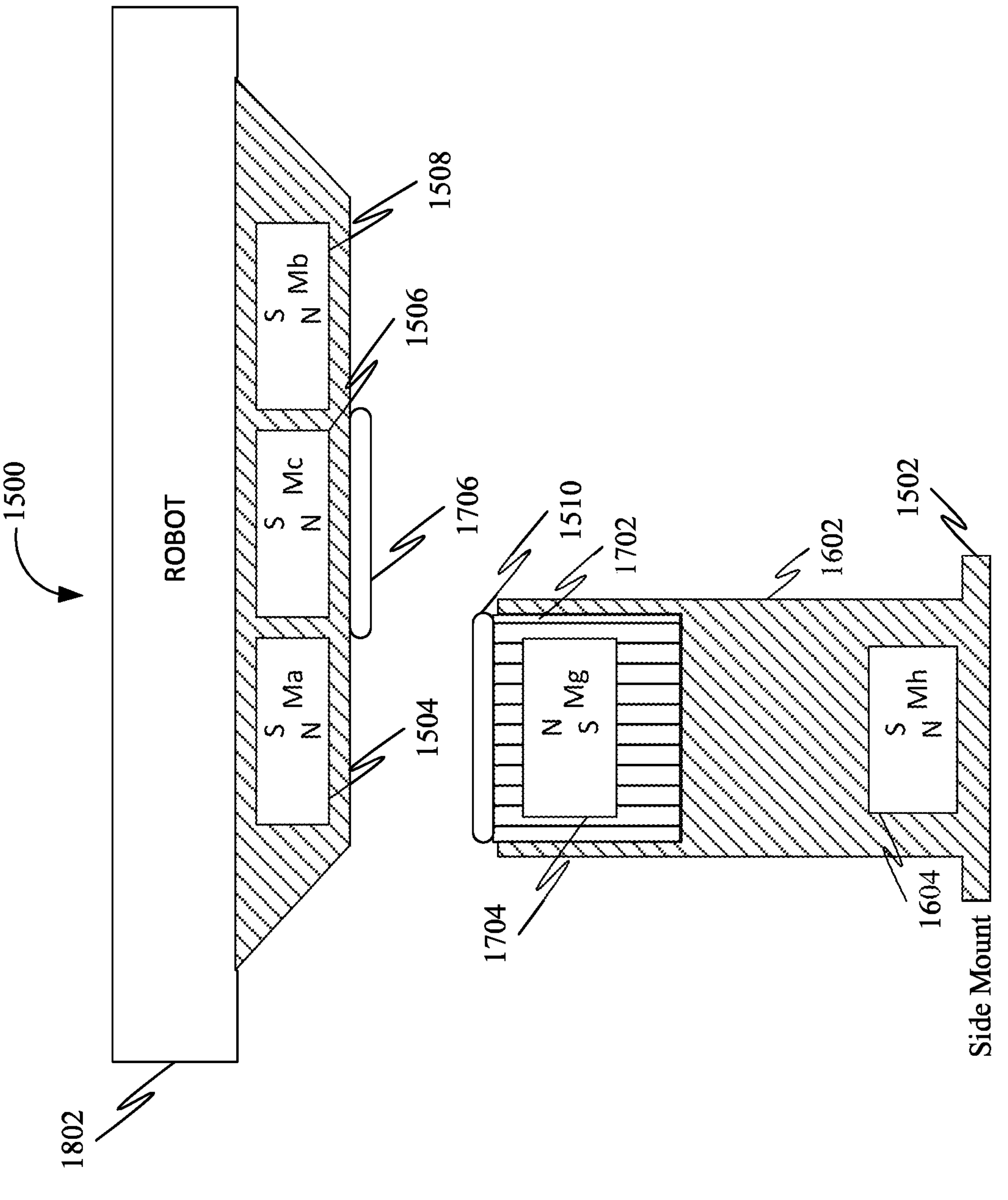
FIG. 24 illustrates the interaction of the autonomous robot with the guide and holder, in accordance with an exemplary embodiment.

Further, in an embodiment, the system 1500 may include one or more different arrangements. As shown in FIG. 23, the base 1502 of the charging station 1512 may include the fourth magnet 1604 and the fifth magnet 1704, the holder 1602, the guide 1702, and the first electric conductive pad 1510. Further, the robot 1802 may include the first magnet 1506, the third magnet 1508, the second magnet 1504, and the second electric conductive pad 1706. Further, when the robot 1802 reaches the charging station 1512 and the third magnet 1508 is over the fifth magnet 1704, the third magnet 1508 and the fifth magnet 1704 may be subject to attractive force Fbg. Since the fifth magnet 1704 is closer to the second magnet 1504 than to the fourth magnet 1604, the Fbg may be greater than the Fhg. The guide 1702 may extent towards the base 1502, and Fbg may increase exponentially while Fhg may decrease by the same exponential. Further, as shown in FIG. 24, when the robot 1802 is moving away from the charging station 1512, the fifth magnet 1704 may reach the first magnet 1506 or the second magnet 1504. The polarity of the first magnet 1506 or the second magnet 1504 may cause a repulsive force Fbg which may push the guide 1702 into the holder 1602. Simultaneously, the fifth magnet 1704 may also be pulled by the fourth magnet 1604 by the force Fhg that may increase as the fifth magnet 1704 and the fourth magnet 1604 may come closer. The combined push and pull action may cause a very fast and clean disconnection between the first electric conductive pad 1510 and the second electric conductive pad 1706.

Figure 25:
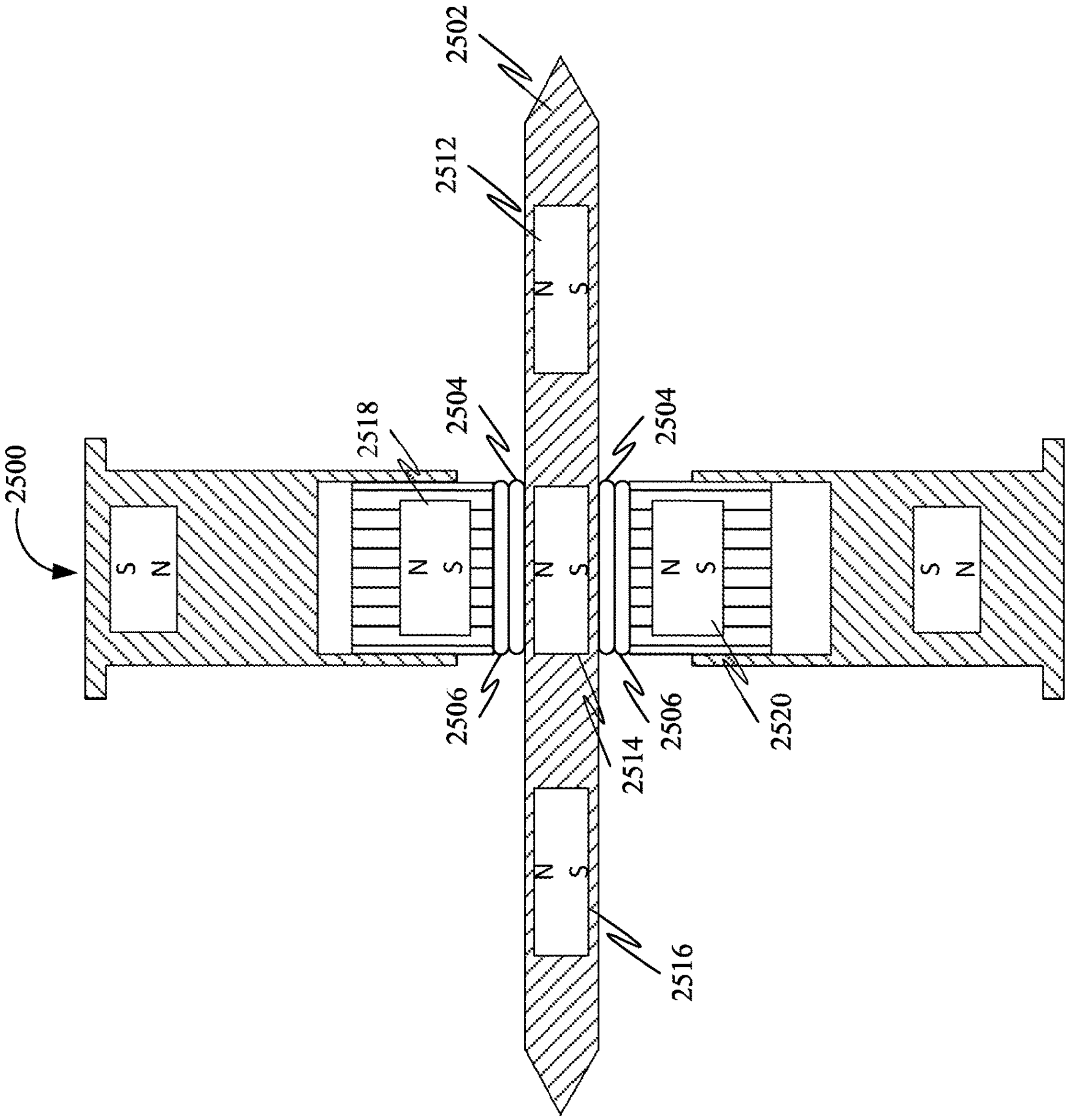
FIG. 25 illustrates the interaction of the autonomous robot with the base station from both sides, in accordance with an exemplary embodiment.

FIG. 25 is an exemplary system 2500 to facilitate a secure connection between a charging station and a mobile device while charging using a plurality of magnets, in accordance with some embodiments. The system 2500 may include a base 2502 with a first electric contact 1504 and a second electric contact 2506 on both sides. Further, the system 2500 may include and a first moving contact 2508 and a second moving contact 2510 that may pinch into the base. Further, the system 2500 may include a first base magnet 2512, a second base magnet 2514, and a third base magnet 2516.

Figure 26:
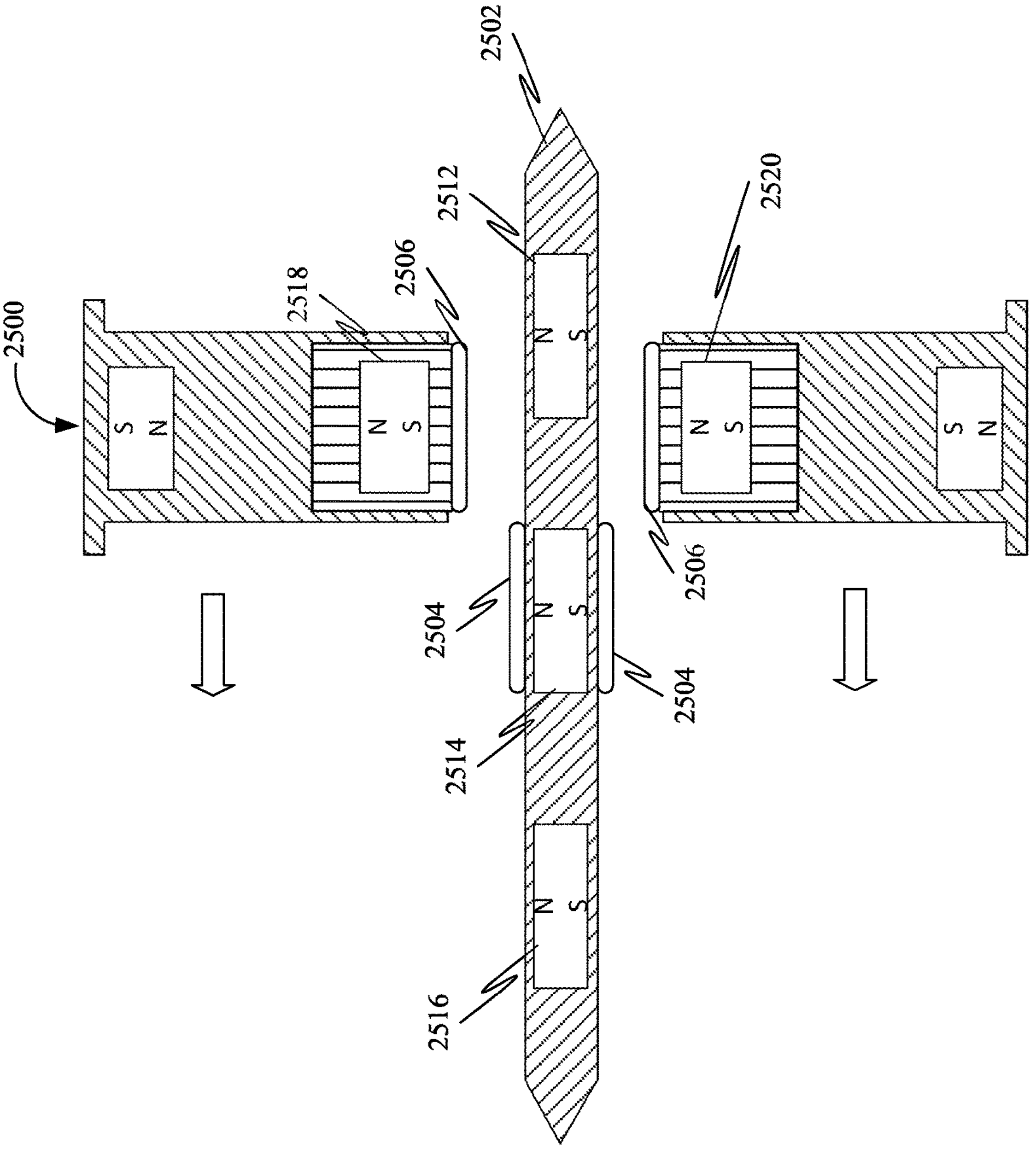
FIG. 26 illustrates the interaction of the autonomous robot with the base station from both sides, in accordance with an exemplary embodiment.

Further, upon reaching a center of the base, a first guide magnet 2518, and a second guide magnet 2520 may experience force of attraction from the second base magnet 2514 from both sides. Further, a first holder magnet 2522, and a second holder magnet 2524 may also exert an attractive force but as the distance between the first guide magnet 2518, the second guide magnet 2520, and the second base magnet 2514 decreases, the attractive force between the first guide magnet 2518 and the second base magnet 2514, and the second guide magnet 2520 and the second base magnet 2514 may increase exponentially. Thus, the first moving contact 2508 and the second moving contact 2510 conductive may connect with the first electric contact 2504 and the second electric contact 2506. Further, as shown in FIG. 26, when moving away, a reverse polarity of the first base magnet 2512, or the third base magnet 2516 may cause a repulsive force leading to a clean disconnection between the first electric contact 2504 and the first moving contact 2508, and the second moving contact 2510 and the second electric contact 2506.

Figure 27:
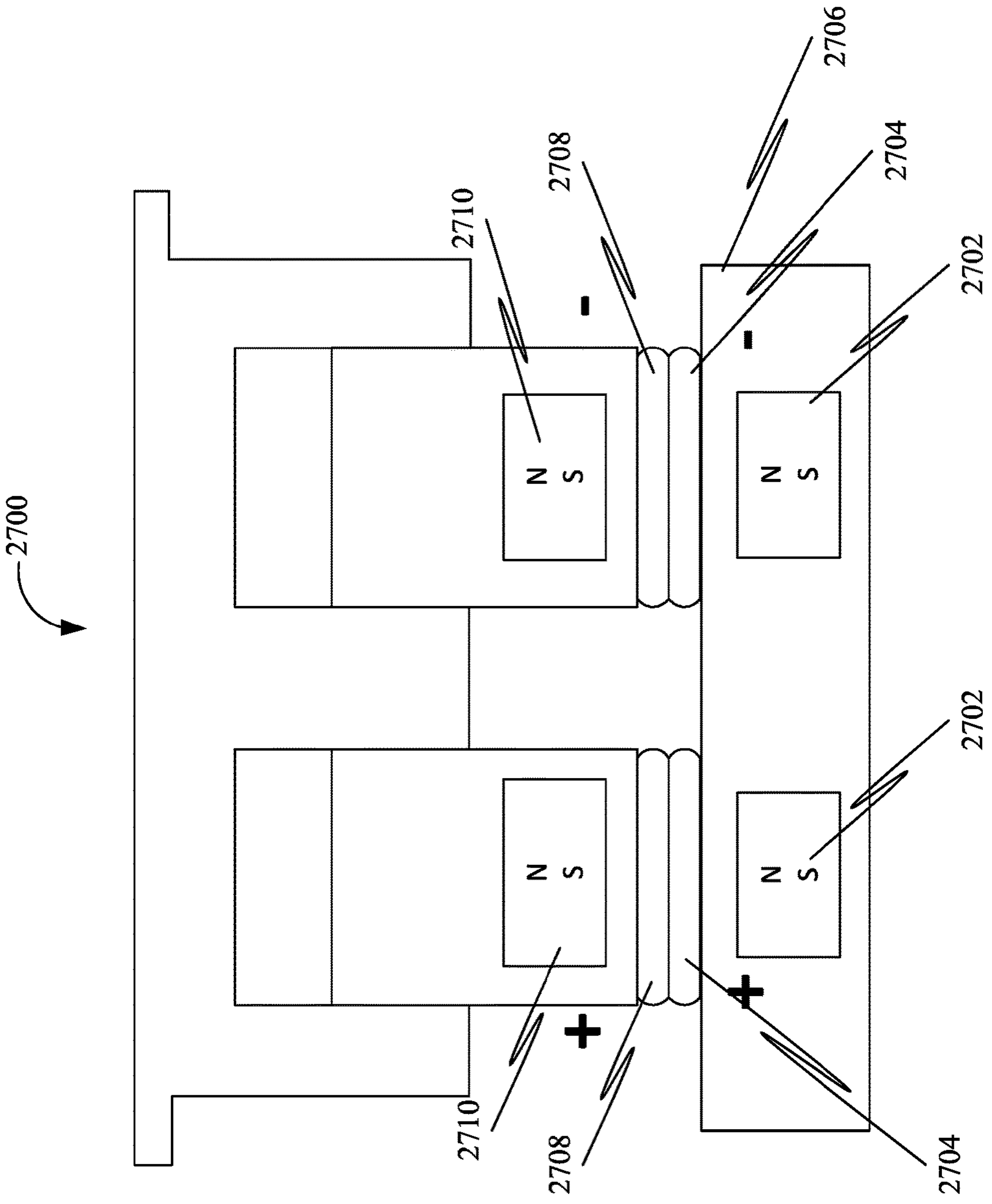
FIG. 27 illustrates the charging mechanism of an autonomous robot using one or more magnets, in accordance with an exemplary embodiment.
Figure 28:
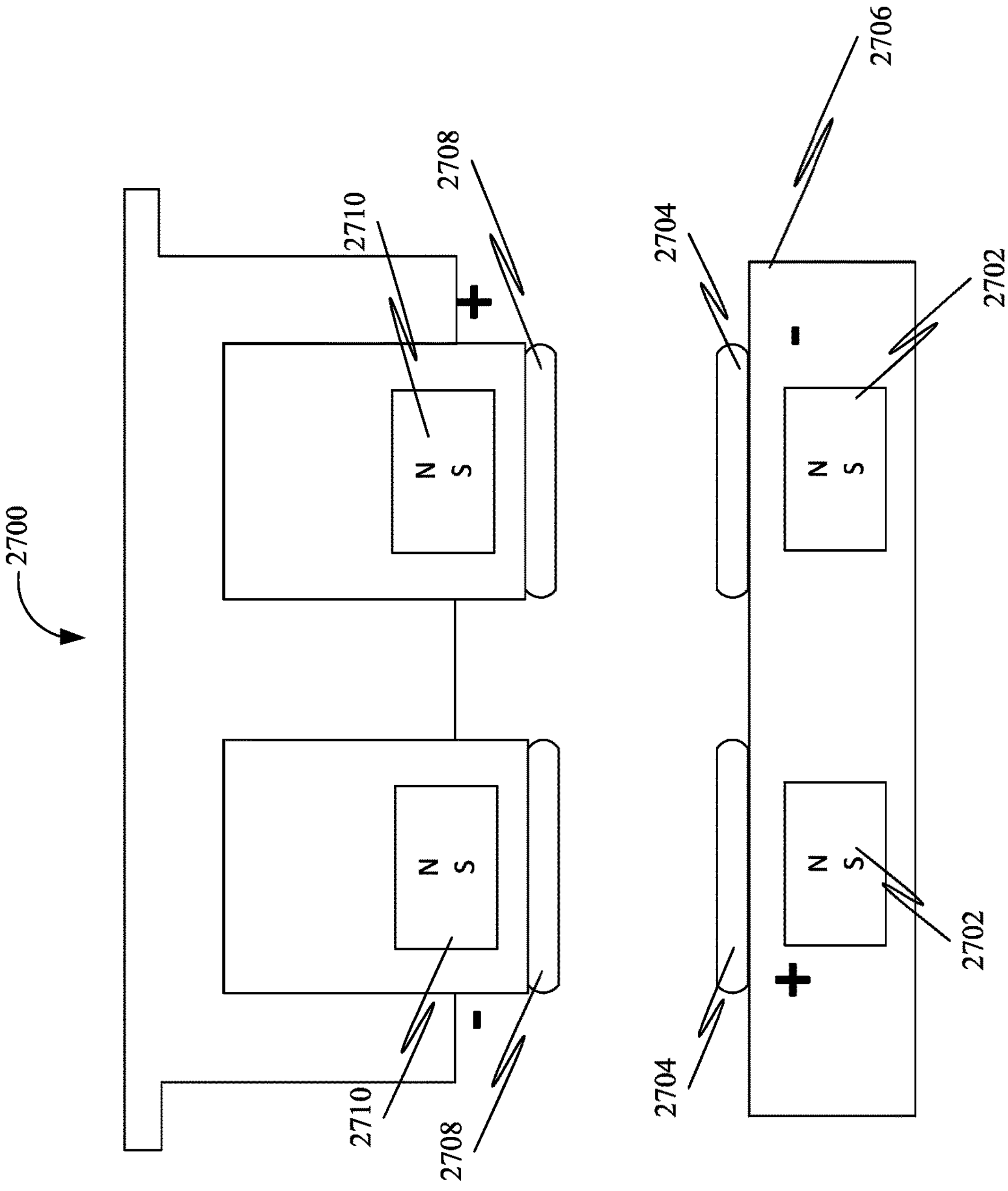
FIG. 28 illustrates the discharging mechanism of an autonomous robot using one or more magnets, in accordance with an exemplary embodiment.

FIG. 27 is an exemplary system 2700 to facilitate a secure connection between a charging station and a mobile device while charging using a plurality of magnets, in accordance with some embodiments. Further, the system 2700 may include a plurality of base magnets 2702 associated with a plurality of charging pads 2704 (positive and negative) on a base 2706. The plurality of magnets 2702 may be made to attract a plurality of holder magnets 2710 only if a plurality of holder charging pads 2708 (positive and negative) are over the plurality of charging pads 2704 positive and negative. If the plurality of charging pads 2704 are inverted, the plurality of base magnets 2702 may be in an opposite direction and cause the plurality of holder charging pads 2708 to stay away from the base 2706 as shown in FIG. 28.

Figure 29:
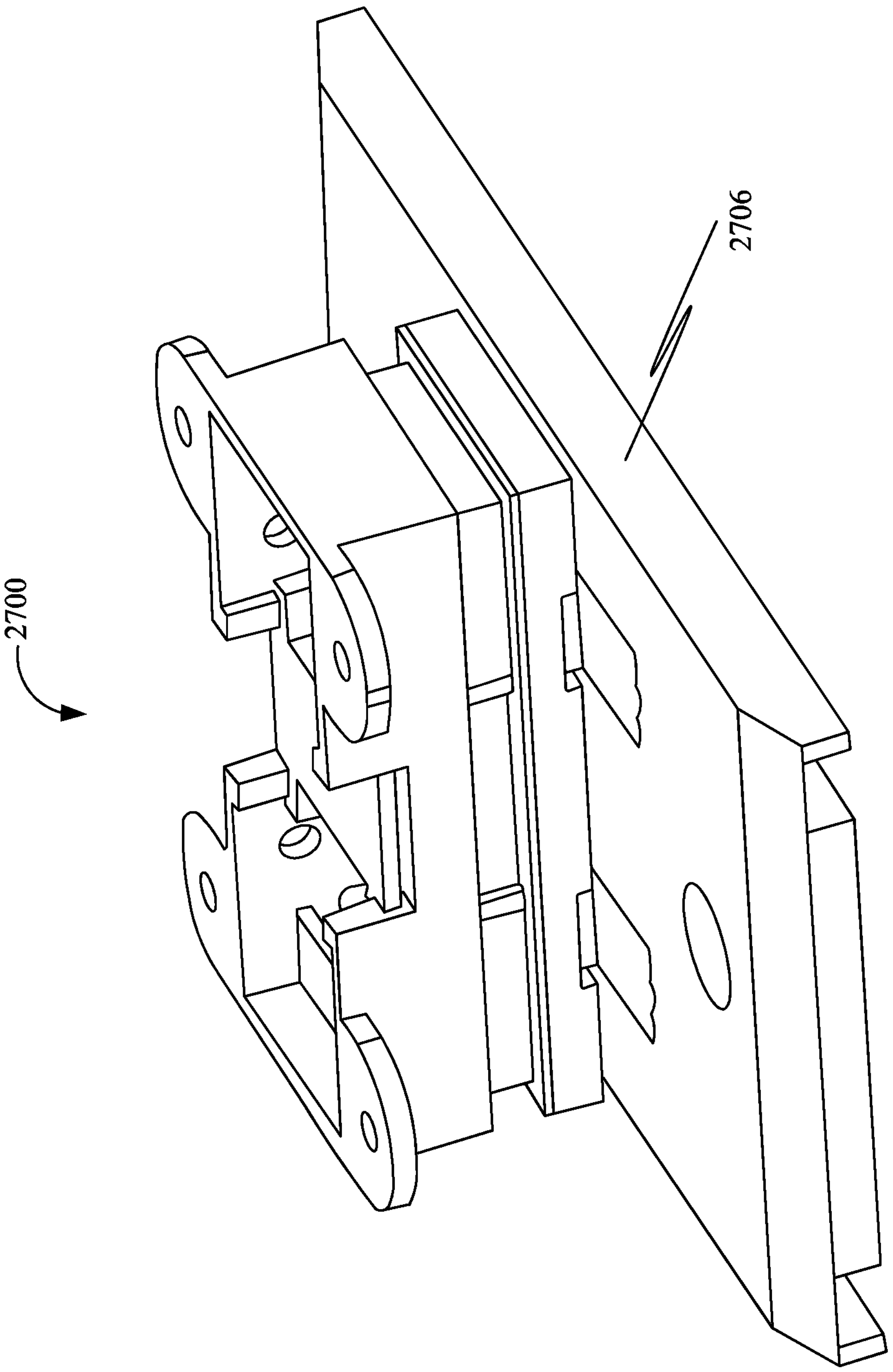
FIG. 29 illustrates a perspective left side view of the system to facilitate a secure connection between a charging station and an autonomous robot while charging using one or more magnets, in accordance with an exemplary embodiment.

FIG. 29 shows a left perspective view of the system 2700.

Figure 30:
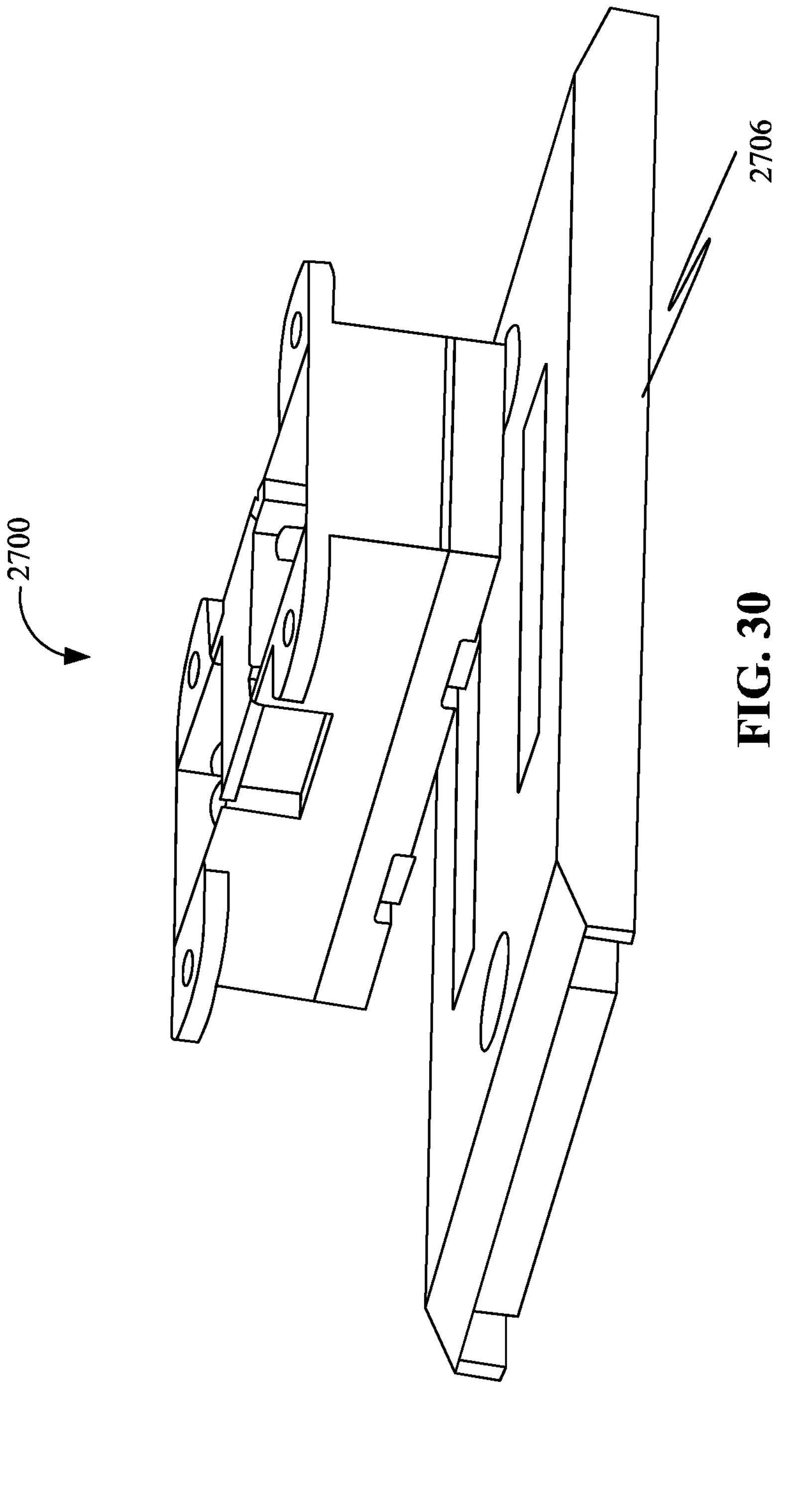
FIG. 30 illustrates a perspective right side view of the system to facilitate a secure connection between a charging station and an autonomous robot while charging using one or more magnets, in accordance with an exemplary embodiment.

FIG. 30 shows a right perspective view of the system 2700.

Figure 31:
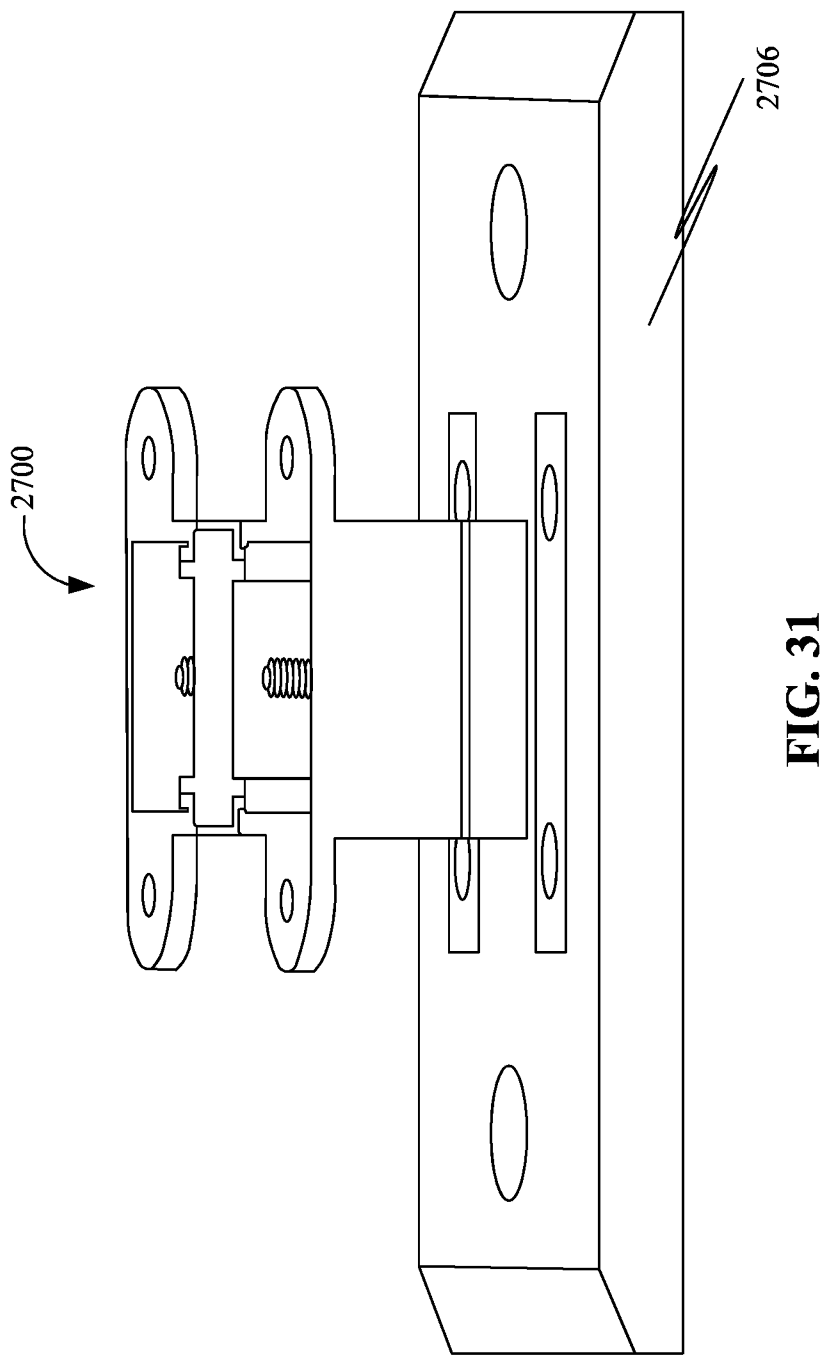
FIG. 31 illustrates a perspective top view of the system to facilitate a secure connection between a charging station and an autonomous robot while charging using one or more magnets, in accordance with an exemplary embodiment.

FIG. 31 shows a top view of the system 2700.

Figure 32:
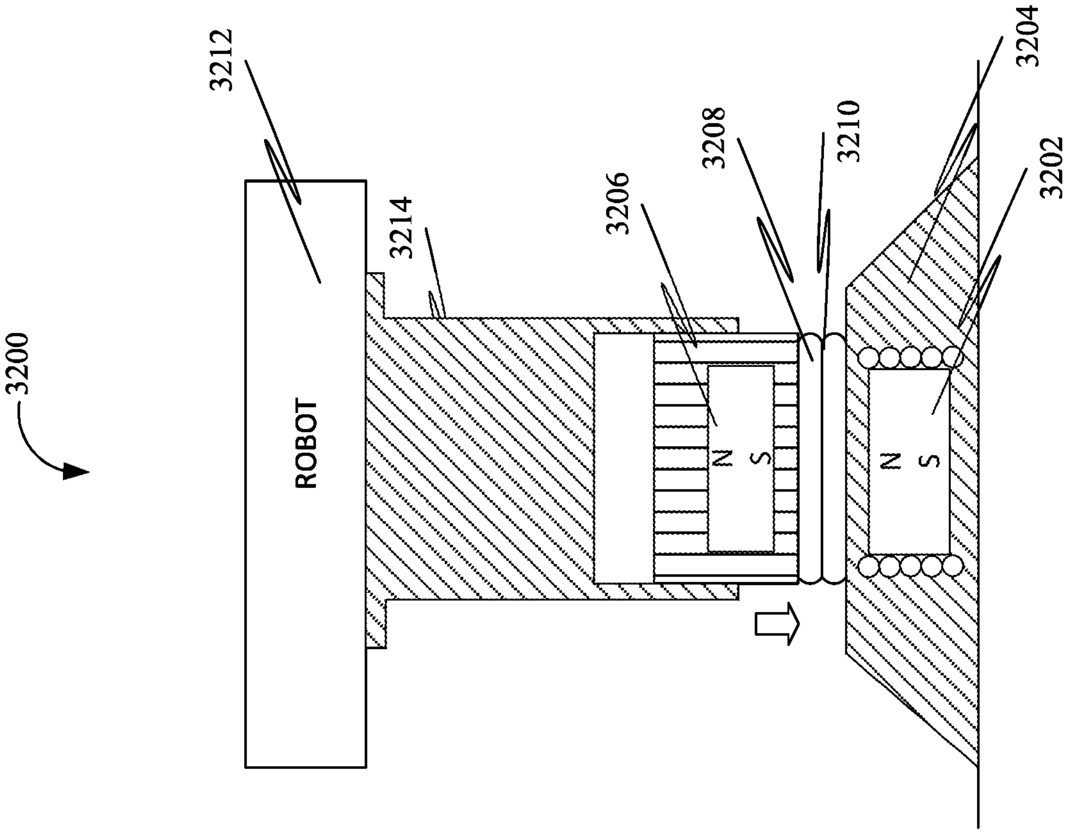
FIG. 32 illustrates the charging mechanism of an autonomous robot using an electromagnet, in accordance with an exemplary embodiment.
Figure 33:
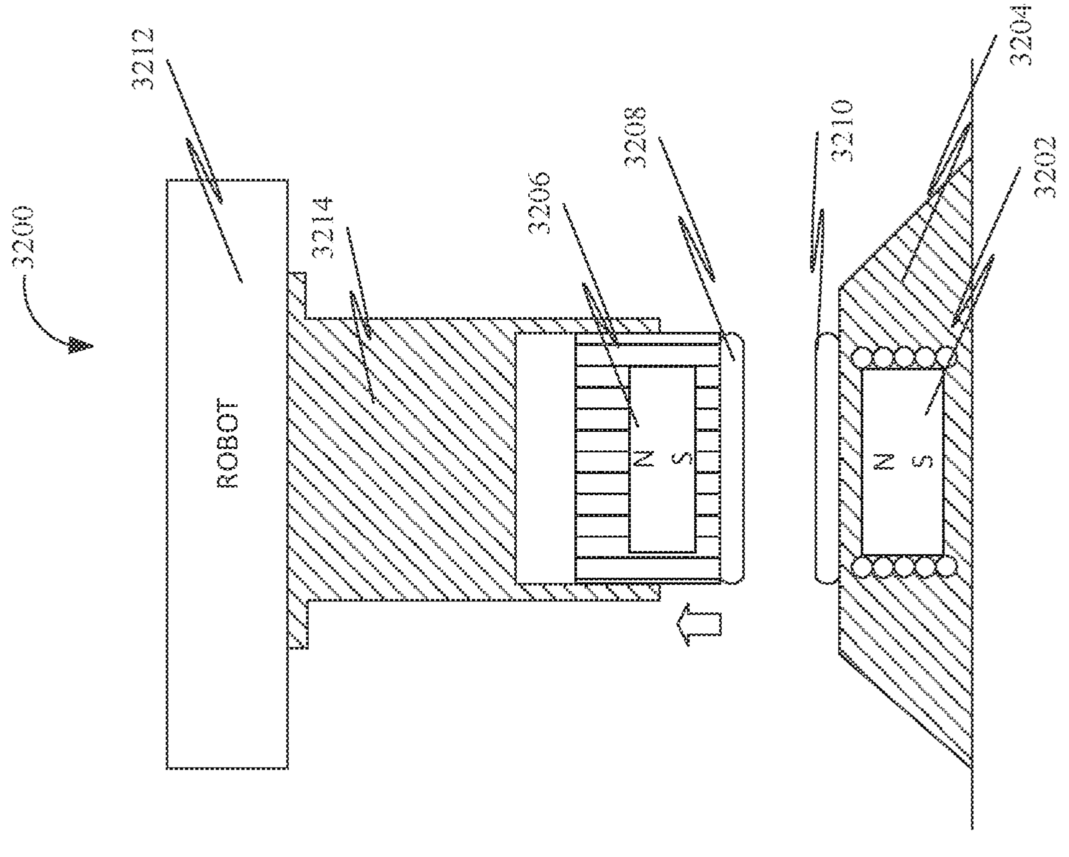
FIG. 33 illustrates the discharging mechanism of an autonomous robot using an electromagnet, in accordance with an exemplary embodiment.

FIG. 32 is an exemplary system 3200 to facilitate a secure connection between a charging station and a mobile device while charging using a plurality of magnets, in accordance with some embodiments. Further, the system 3200 may include an electromagnet 2202 embedded in a fixed base 3204. The electromagnet 3202 may be energized to create an attractive magnetic field to attract a second magnet 3206. Accordingly, a first conductive pad 3208 and a second conductive pad 3210 may come in contact to charge a robot 3212. After charge is complete, the electromagnet 3202 may reverse in polarity. Accordingly, along with a force of repulsion between the electromagnet 3202 and the second magnet 3206, and a force of attraction between the electromagnet 3202 and a third magnet 3214, the first conductive pad 3208 may cleanly disconnect with the second conductive pad 3210, as shown in FIG. 33.

Figure 34:
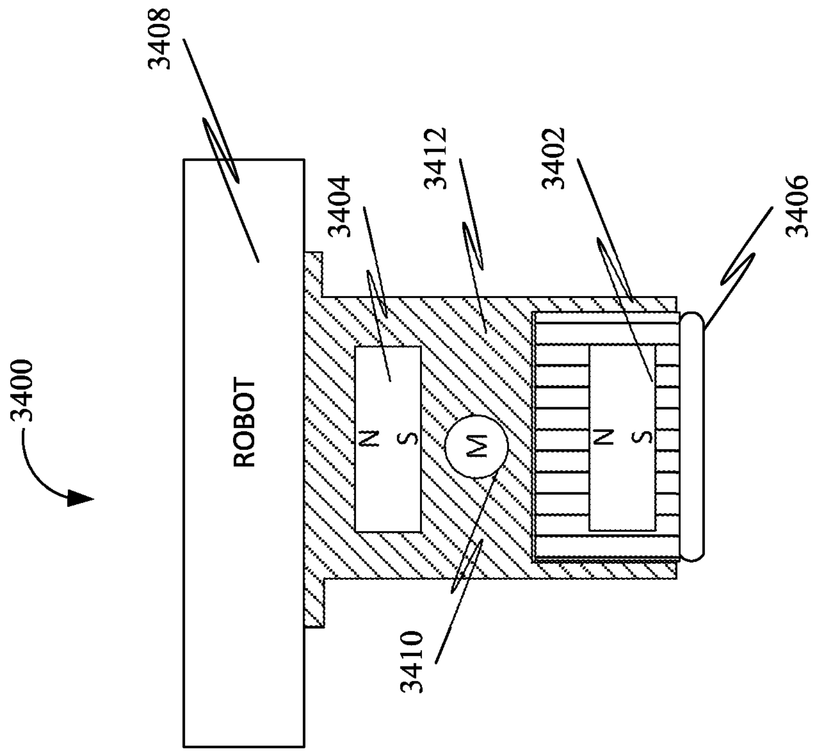
FIG. 34 illustrates a system to facilitate the detection of a contact between a first conductive pad and a second conductive pad, in accordance with an exemplary embodiment.

FIG. 34 is a system 3400 to facilitate the detection of a contact between a first conductive pad and a second conductive pad of a charging station and an autonomous robot while charging, in accordance with an exemplary embodiment. Further, the system 3400 may include a first magnet 3402, a second magnet 3404, a first conductive pad 3406, a second conductive pad (not shown), a magnetic hall sensor 3410 or a reed switch. Further, the first magnet 3402 and second magnet 3404 may be housed in a retractable housing 3412. The retractable housing 3414 and components of the system 3400 such as the first magnet 3402 and second magnet 3404 may be attached to an autonomous robot 3408 in such a way that the movement of autonomous robot 3408 may not be hindered. Further, first magnet 3402 and second magnet 3404 may be permanent magnets. The magnets may be aligned in such a way that polarity of first magnet 3402 is opposite to polarity of second magnet 3404. For instance, the south pole of first magnet 3402 may face the north pole of second magnet 3404. The opposite polarity may generate an attractive force. The second magnet 3404 may be attached to a first conductive pad 3406 that may include electrical contact area to charge the autonomous robot 3408. The first conductive pad 3406 may be made of a solid material in the shape of a square or a rectangle which may absorb heat and allow the electricity to pass through the first conductive pad 3406. The magnetic hall sensor 3410 may consist of a thin piece of rectangular p-type semiconductor material. The semiconductor material may include materials such as gallium arsenide (GaAs), indium antimonide (InSb) or indium arsenide (InAs), and so on.

Figure 35:
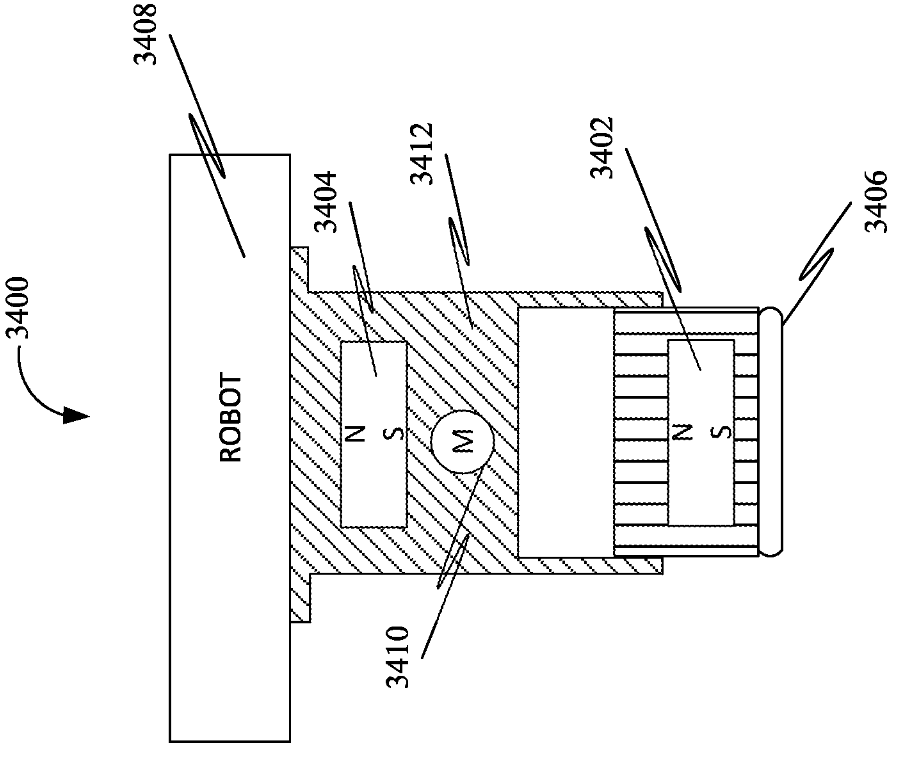
FIG. 35 illustrates a system to facilitate the detection of a contact between the first conductive pad and a second conductive pad, showing an extended retractable housing, in accordance with an exemplary embodiment.

Further, the system 3400 may include a third magnet (not shown) that may be a part of a charging station. The charging station may be connected to an electrical outlet. The third magnet may be an electromagnet stronger than first magnet 3402, the polarity of which may be controllable. Further, the second conductive pad may also include electrical contact area to charge the autonomous robot 3408. The second conductive pad may be attached over the surface of the third magnet. Accordingly, without the action of an external force, first magnet 3402 and second magnet 3404 may be in an equilibrium state, and the retractable housing 3412 may be retracted. Further, to begin charging, the autonomous robot 3408 may move and position over the charging station 3414. Accordingly, the third magnet may be turned on so that the north pole of the second magnet 3404 may face the south pole of the third magnet and vice versa. The opposite polarity may generate a force of attraction the second magnet 3404 and the third magnet. Further, the attractive force may lead to the retractable housing 3412 to be extended, as shown in FIG. 35. Accordingly, the electrical contacts on the first conductive pad 3406 and the second conductive pad may come in connect with each other. Further, the magnetic hall sensor 3410 and/or the reed switch may activate upon experiencing a change in magnetic field.

Figure 36:
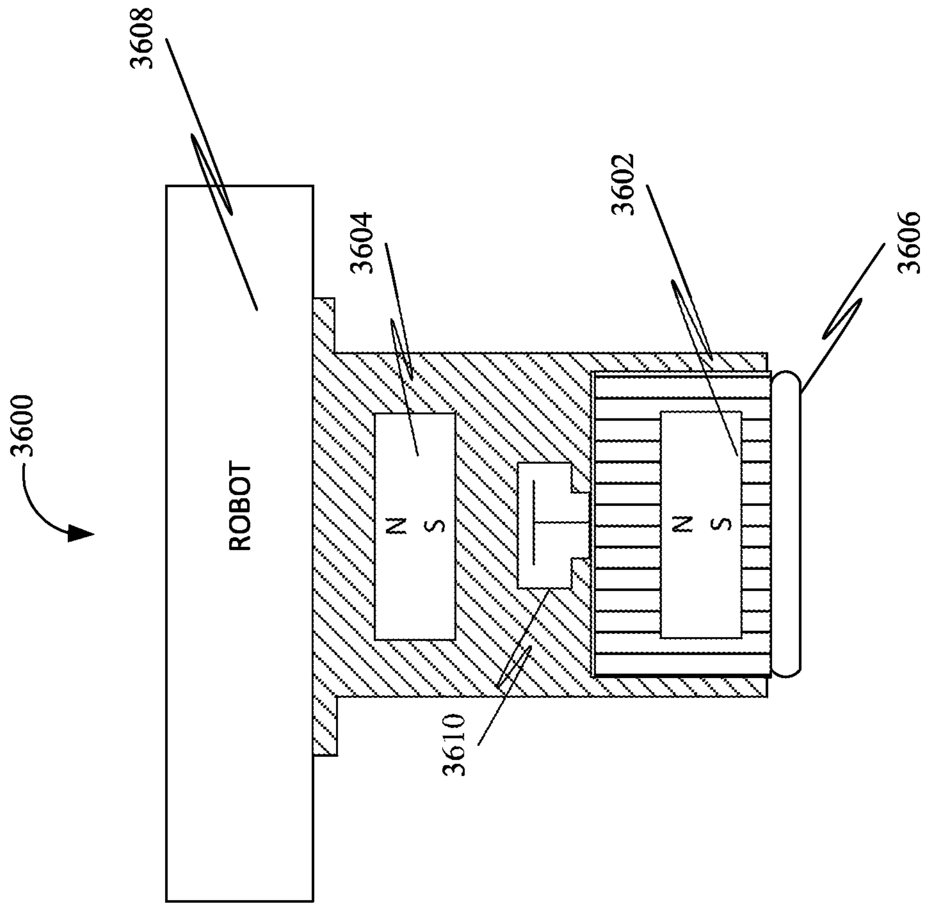
FIG. 36 illustrates a system to facilitate the detection of a contact between the first conductive pad and a second conductive pad using a mechanical micro switch, in accordance with an exemplary embodiment.

FIG. 36 illustrates a system 3600 to facilitate the detection of a contact between the first conductive pad and a second conductive pad using a mechanical micro switch, in accordance with an exemplary embodiment. Further, the system 3600 may include a first magnet 3602, a second magnet 3604, a first conductive pad 3606, a second conductive pad (not shown), and a mechanical micro switch 3610. Further, the first magnet 3602 and second magnet 3604 may be housed in a retractable housing. The retractable housing and components of the system 3600 such as the first magnet 3602 and second magnet 3604 may be attached to an autonomous robot 3608 in such a way that the movement of autonomous robot 3608 may not be hindered. Further, first magnet 3602 and second magnet 3604 may be permanent magnets. The magnets may be aligned in such a way that polarity of first magnet 3602 is opposite to polarity of second magnet 3604. For instance, the south pole of first magnet 3602 may face the north pole of second magnet 3604. The opposite polarity may generate an attractive force. The second magnet 3604 may be attached to a first conductive pad 3606 that may include electrical contact area to charge the autonomous robot 3608. The first conductive pad 3606 may be made of a solid material in the shape of a square or a rectangle which may absorb heat and allow the electricity to pass through the first conductive pad 3606. The mechanical micro switch 3610 may be housed between the first magnet and the second magnet. The mechanical micro switch may be an electric switch which may be actuated by a little physical force. The mechanical micro switch may be connected to a LED. Accordingly, when the first conductive pad 3606 and the second conductive pad may not be in contact with each other, the mechanical micro switch 3606 may lose electrical connection. Accordingly, the LED may then stay turned off which may resemble the disconnection between the first conductive 3606 pad and the second conductive pad.

Figure 37:
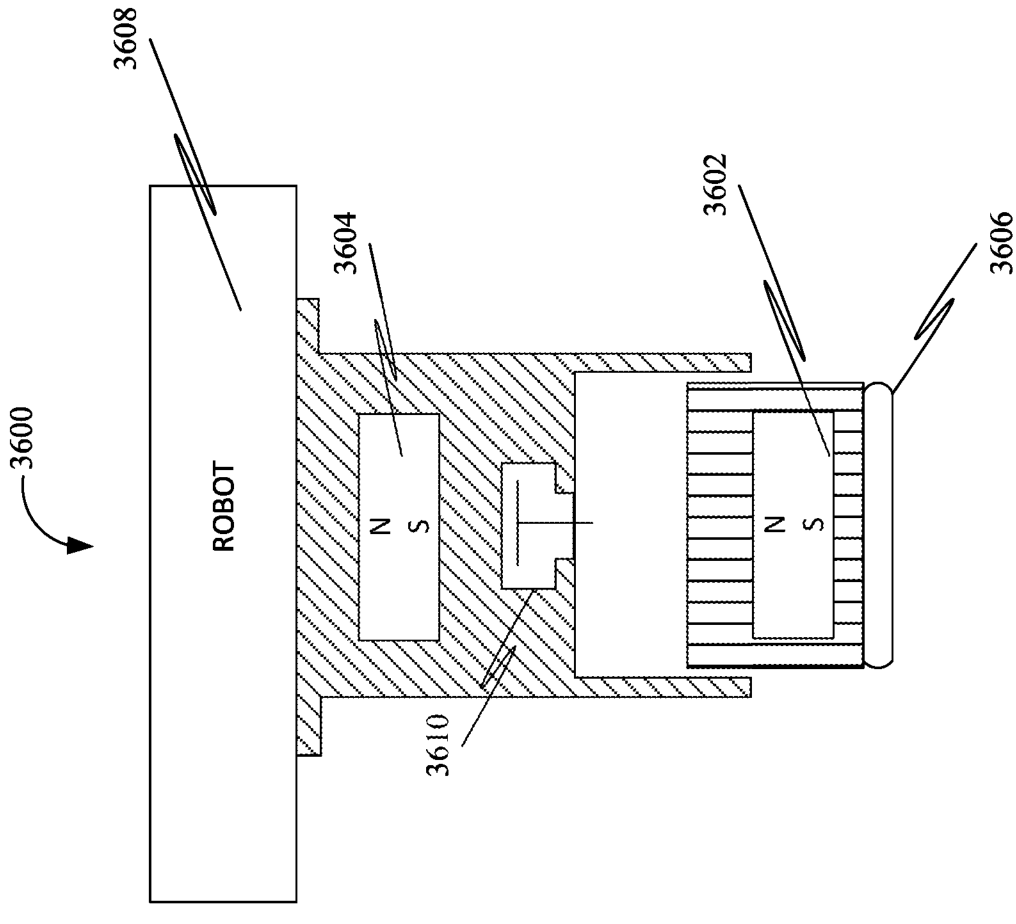
FIG. 37 illustrates a system to facilitate the detection of a contact between the first conductive pad and a second conductive pad using a mechanical micro switch, showing an extended retractable housing, in accordance with an exemplary embodiment.

Further, the system 3600 may include a third magnet (not shown) that may be a part of a charging station. The charging station may be connected to an electrical outlet. The third magnet may be an electromagnet stronger than first magnet 3602, the polarity of which may be controllable. Further, the second conductive pad may also include electrical contact area to charge the autonomous robot 3608. The second conductive pad may be attached over the surface of the third magnet. Accordingly, without the action of an external force, first magnet 3602 and second magnet 3604 may be in an equilibrium state, and the retractable housing may be retracted. Further, to begin charging, the autonomous robot 3608 may move and position over the charging station 3614. Accordingly, the third magnet 3610 may be turned on so that the north pole of the second magnet 3604 may face the south pole of the third magnet and vice versa. The opposite polarity may generate a force of attraction the second magnet 3604 and the third magnet. Further, the attractive force may lead to the retractable housing to be extended, as shown in FIG. 37. Accordingly, the electrical contacts on the first conductive pad 3606 and the second conductive pad may come in contact with each other. The connection may activate the mechanical micro switch 3610 which may turn on the LED. The glowing LED may resemble the connection between the first conductive pad 3606 and the second conductive pad.

The connection may activate the mechanical micro switch which may turn on the LED. The glowing LED may resemble the connection between the first conductive pad 3606 and the second conductive pad.

Although the disclosure has been explained in relation to its preferred embodiment, it is to be understood that many other possible modifications and variations can be made without departing from the spirit and scope of the disclosure.

What is claimed is:

1. A system for facilitating electrical connection of a first electrical unit comprised in a first object with a second electrical unit comprised in a second object, the system comprising:

- a base unit configured to be attached to the first object, the base unit comprising:
  - a base body comprised of a non-conducting material;
  - a base conductive pad disposed in a mid-region of the base body, wherein at least a portion of the base conductive pad is exposed over a surface of the base body corresponding to the mid-region, wherein the base conductive pad is configured for conducting electricity, wherein the base conductive pad is electrically coupled to the first electrical unit;
  - a plurality of base magnets comprising a first magnet disposed in a first region of the base body, a second magnet disposed in a second region of the base body and a third magnet disposed in the mid-region of the base body, wherein the mid-region is situated in between the first region and the second region, wherein each of the first magnet and the second magnet is disposed according to a repelling magnetic orientation, wherein the third magnet is disposed according to an attracting magnetic orientation, wherein the attracting magnetic orientation is opposite to the repelling magnetic orientation;
- a holder unit configured to be attached to the second object, the holder unit comprising:
  - a holder body comprised of a non-conducting material;
  - a holder magnet disposed in the holder body, wherein the holder body comprises a cavity; and
- a moving guide configured to be disposed, at least in part, within the cavity of the holder unit, wherein the moving guide comprises:
  - a guide body comprised of a non-conducting material;
  - a guide conductive pad disposed in the guide body, wherein the guide conductive pad is configured to be electrically coupled to the second electrical unit; and
  - a guide magnet disposed in the guide body, wherein the moving guide is configured to slidably move within the cavity between a retracted position and an extended position, wherein in the extended position, the moving guide is configured to form a physical contact between guide conductive pad and the base conductive pad, wherein a holder attraction force is associated with magnetic attraction between the holder magnet and the guide magnet, wherein a base attraction force is associated with magnetic attraction between the guide magnet and the third magnet when the holder unit is in proximity to the base unit, wherein the base attraction force is greater than the holder attraction force by a predetermined quantity, wherein a base repulsion force is associated with magnetic repulsion between the guide magnet and each of the first magnet and the second magnet when the holder unit is in proximity to the base unit, wherein the second object is configured to travel over the base unit starting from the first region and traversing towards the second region.

2. The system of claim 1, wherein the first object comprises a stationary object, wherein the second object comprises a mobile apparatus, wherein the first electrical unit comprises an electrical energy source, wherein the second electrical unit comprises a rechargeable energy source.

3. The system of claim 1, wherein the first object comprises mobile apparatus, wherein the second object comprises a stationary object, wherein the first electrical unit comprises a rechargeable energy source, wherein the second electrical unit comprises an electrical energy source.

4. The system of claim 1, wherein the holder unit further comprises:

- a state sensor configured for sensing a state of the moving guide within the cavity, wherein the state sensor generates sensor data representing the state; and
- a processing device communicatively coupled to the state sensor, wherein the processing device is configured for performing at least one action based on the sensor data.

5. The system of claim 4, wherein the state sensor comprises at least one of a magnetic hall sensor and a micro-switch.

6. The system of claim 1, wherein the first object comprises at least one of a flooring, a ceiling and a wall.

7. The system of claim 1, wherein at least one base magnet of the plurality of base magnets comprises at least one electromagnet.

8. The system of claim 1, wherein at least one of the holder magnet and the guide magnet comprises at least one electromagnet.

9. The system of claim 2, wherein the second object comprises a ground connector electrically coupled to the rechargeable energy source, wherein the ground connector is configured to form a physical contact with a grounding conductor embedded in the first object, wherein a grounding terminal of the electrical energy source is electrically coupled with the grounding conductor.

10. The system of claim 2, wherein the base conductive pad comprises a positive base conductive pad electrically connected to a positive electrical terminal of the electrical energy source and a negative base conductive pad electrically connected to the negative terminal of the electrical energy source, wherein the plurality of base magnets comprises a plurality of positive base magnets and a plurality of negative base magnets, wherein the first magnet comprises a first positive magnet and a first negative magnet, wherein the first positive magnet is disposed in a first side of the first region, wherein the first negative magnet is disposed in a second side of the first region, wherein the second magnet comprises a second positive magnet and a second negative magnet, wherein the second positive magnet is disposed in a first side of the second region, wherein the second negative magnet is disposed in a second side of the second region, wherein the third magnet comprises a third positive magnet and a third negative magnet, wherein the third positive magnet is disposed in a first side of the mid-region, wherein the third negative magnet is disposed in a second side of the mid-region, wherein the holder unit comprises a positive holder unit corresponding to a positive terminal of the rechargeable energy source and a negative holder unit corresponding to a negative terminal of the rechargeable energy source, wherein holder body comprises a positive holder body and a negative holder body, wherein the holder magnet comprises a positive holder magnet and a negative holder magnet, wherein the moving guide comprises a positive moving guide and a negative moving guide, wherein the guide body comprises a positive guide body and a negative guide body, wherein the guide conductive pad comprises a positive guide conductive pad and a negative guide conductive pad, wherein the positive guide conductive pad is electrically connected to the positive terminal of the rechargeable energy source, wherein the negative conductive pad is electrically connected to the negative terminal of the rechargeable energy source, wherein the guide magnet comprises a positive guide magnet disposed in the positive guide body and a negative guide magnet disposed in the negative guide body.

11. The system of claim 10, wherein the positive guide conductive pad and the negative guide conductive pad are electrically connected to the positive terminal and the negative terminal of the rechargeable energy source through a rectifier, wherein the rectifier is configured to deliver electrical energy to the rechargeable energy source characterized by a predetermined polarity, independent of the polarity of electrical energy received from the positive guide conductive pad and the negative guide conductive pad.

12. The system of claim 10, wherein the third positive magnet is disposed according to a positive attracting orientation, wherein the third negative magnet is disposed according to a negative attracting orientation, wherein the positive guide magnet is disposed in the positive attracting orientation, wherein the positive moving guide is configured to be attracted towards the third positive magnet, wherein the positive moving guide is configured to be repelled away from the third negative magnet, wherein the negative moving guide is configured to be attracted towards the third negative magnet, wherein the negative moving guide is configured to be repelled away from the third positive magnet.

13. The system of claim 2, wherein the base conductive pad comprises a positive base conductive pad electrically connected to a positive electrical terminal of the electrical energy source and a negative base conductive pad electrically connected to the negative terminal of the electrical energy source, wherein the positive base conductive pad is disposed on a left side of the base body and the negative base conductive pad is disposed on a right side of the base body, wherein the holder unit comprises a positive holder unit corresponding to a positive terminal of the rechargeable energy source and a negative holder unit corresponding to a negative terminal of the rechargeable energy source, wherein holder body comprises a positive holder body and a negative holder body, wherein the holder magnet comprises a positive holder magnet and a negative holder magnet, wherein the moving guide comprises a positive moving guide and a negative moving guide, wherein the guide body comprises a positive guide body and a negative guide body, wherein the guide conductive pad comprises a positive guide conductive pad and a negative guide conductive pad, wherein the positive guide conductive pad is electrically connected to the positive terminal of the rechargeable energy source, wherein the negative conductive pad is electrically connected to the negative terminal of the rechargeable energy source, wherein the guide magnet comprises a positive guide magnet disposed in the positive guide body and a negative guide magnet disposed in the negative guide body, wherein the positive holder unit is disposed on a first side of the mobile apparatus and the negative holder unit is disposed on a second side of the mobile apparatus, wherein the positive moving guide in the extended position is configured to form a physical contact between the positive guide conductive pad and the positive base conductive pad, wherein the negative moving guide in the extended position is configured to form a physical contact between the negative guide conductive pad and the negative base conductive pad.

14. The system of claim 1, wherein each of the plurality of base magnets, the holder magnet and the guide magnet comprises permanent magnets.

15. The system of claim 2, wherein each of the plurality of base magnets, the holder magnet and the guide magnet comprises electromagnets.

16. The system of claim 15 further comprising:

a base processing device configured for controlling electrical energy provided to the plurality of base magnets;

a holder processing device configured for controlling electrical energy provided to at least one of the holder magnet and the guide magnet.

17. The system of claim 16 further comprising a proximity sensor configured for detecting a proximity of the mobile apparatus to the base unit, wherein the proximity sensor is communicatively coupled to at least one of the base processing device and the holder processing device, wherein the base processing device is configured for controlling electrical energy provided to the plurality of base magnets based on detecting the proximity, wherein the holder processing device is configured for controlling electrical energy provided to at least one of the holder magnet and the guide magnet based on detecting the proximity.

18. The system of claim 2, wherein the mobile apparatus comprises a mobile robot.

19. The system of claim 1, wherein the base conductive pad comprises a base planar surface, wherein the guide conductive pad comprises a guide planar surface, wherein the base planar surface and the guide planar surface are characterized by a common geometrical feature.

20. The system of claim 1, wherein at least one of the base conductive pad and the guide conductive pad comprises of a copper-beryllium composite.

* * * * *